United States Patent
MacDonald et al.

(10) Patent No.: US 10,545,243 B2
(45) Date of Patent: Jan. 28, 2020

(54) SYSTEMS AND METHODS FOR IMPROVED ATMOSPHERIC MONITORING AND GPS POSITIONING UTILIZING GNSS TOMOGRAPHIC REFRACTIVITY

(71) Applicant: Spire Global, Inc., San Francisco, CA (US)

(72) Inventors: Alexander E. MacDonald, Boulder, CO (US); Peter Platzer, San Francisco, CA (US)

(73) Assignee: SPIRE GLOBAL, INC., San Francisco, CA (US)

( * ) Notice: Subject to any disclaimer, the term of this patent is extended or adjusted under 35 U.S.C. 154(b) by 0 days.

(21) Appl. No.: 15/808,954

(22) Filed: Nov. 10, 2017

(65) Prior Publication Data

US 2019/0146092 A1     May 16, 2019

(51) Int. Cl.
*G01S 19/07* (2010.01)
*G01S 19/08* (2010.01)
*G01S 19/25* (2010.01)

(52) U.S. Cl.
CPC .............. *G01S 19/07* (2013.01); *G01S 19/08* (2013.01); *G01S 19/258* (2013.01)

(58) Field of Classification Search
CPC .......... G01S 19/07; G01S 19/08; G01S 19/14; G01S 19/21; G01S 19/23; G01S 19/25; G01S 19/258; G01S 19/26; G01S 19/40; G01S 19/41; G01S 19/42; G01S 19/45; G01W 2001/006
See application file for complete search history.

(56) References Cited

U.S. PATENT DOCUMENTS

| | | | |
|---|---|---|---|
| 5,675,081 A | | 10/1997 | Solheim et al. |
| 5,828,336 A | * | 10/1998 | Yunck ..................... G01S 19/07 342/357.31 |
| 7,623,065 B2 | | 11/2009 | Tillotson |

(Continued)

OTHER PUBLICATIONS

Ware et al., "Real-time national GPS networks: Opportunities for atmospheric sensing," Earth Planets Space, 54, 901-905, 2000.

(Continued)

*Primary Examiner* — Bernarr E Gregory
*Assistant Examiner* — Daniel P Malley, Sr.
(74) *Attorney, Agent, or Firm* — Troutman Sanders LLP

(57) ABSTRACT

The disclosed technology relates to systems and methods for determining three-dimensional atmospheric and ionospheric density using refraction of electromagnetic waves. A method is provided for receiving, at a processing system, and from a plurality of Global Navigation Satellite Systems (GNSS) stations, navigation data corresponding to computed positions of the plurality of GNSS stations. The method can further include determining, based at least in part on received navigation data and received GNSS transmitter information, ionosphere and atmosphere refractivity corresponding to intersections of two or more GNSS signals. The method can include calculating, based on the determined 3D density states, data fields of a model representing the three-3D density states. The method can include transmitting position adjustment data to calibrate a navigation position of at least one of the plurality of the GNSS stations based at least in part on the calculated data fields of the model.

9 Claims, 14 Drawing Sheets

(56) References Cited

U.S. PATENT DOCUMENTS

| | | |
|---|---|---|
| 7,739,048 B2 | 6/2010 | Tillotson et al. |
| 8,487,811 B1 | 7/2013 | Zhang |
| 8,738,035 B1 | 5/2014 | Ramakrishnan et al. |
| 8,768,617 B2 | 7/2014 | Colley et al. |
| 2006/0017610 A1* | 1/2006 | Komjathy ............... G01S 19/07 342/357.31 |
| 2006/0080038 A1* | 4/2006 | Jakowski ............... G01S 19/14 702/2 |
| 2011/0241934 A1 | 10/2011 | Miocinovic et al. |
| 2013/0021200 A1* | 1/2013 | Brosius ............... G01S 5/0036 342/357.46 |
| 2013/0201058 A1* | 8/2013 | Stephens ............... G01S 19/21 342/357.59 |
| 2014/0253375 A1 | 9/2014 | Rudow et al. |
| 2016/0011318 A1* | 1/2016 | Cohen ............... G01S 19/05 342/357.26 |

OTHER PUBLICATIONS

MacDonald et al., "Diagnosis of Three-Dimensional Water Vapor Using a GPS Network," Monthly Weather Review, vol. 130, pp. 386-397, 2002.

Masutani et al., "Observing system simulation experiments at the National Centers for Environmental Prediction," Journal of Geophysical Research, D07101, 2010.

Kalney, "Atmospheric Modeling, Data Assimilation and Predictability," Cambridge University Press, 2003.

Solheim et al., "Propagation delays induced in GPS signals by dry air, water vapor, hydrometeors, and other particulates" Journal of Geophysical Research, vol. 104, Issue D8, Apr. 1, 1999, pp. 9663-9670.

International Search Report and Written Opinion dated Jan. 25, 2019, issued in corresponding Application No. PCT/US2018/058760.

* cited by examiner

FIG. 10A
FIG. 10B
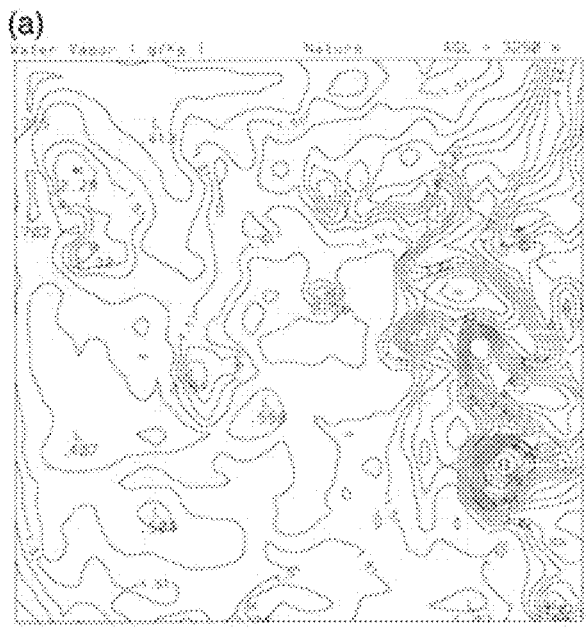
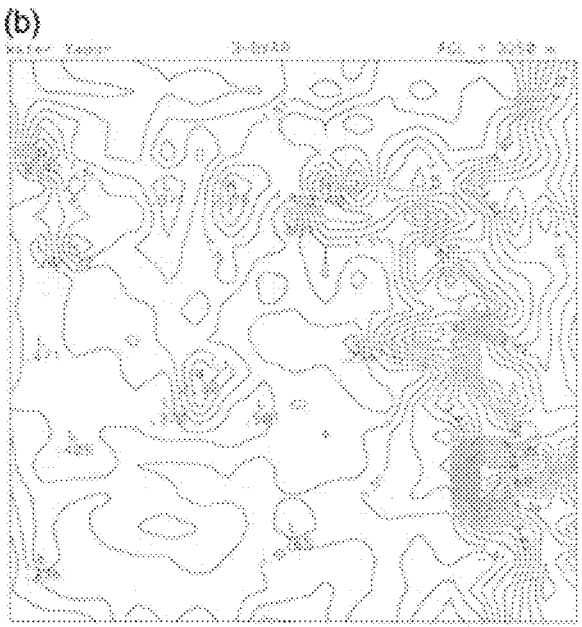
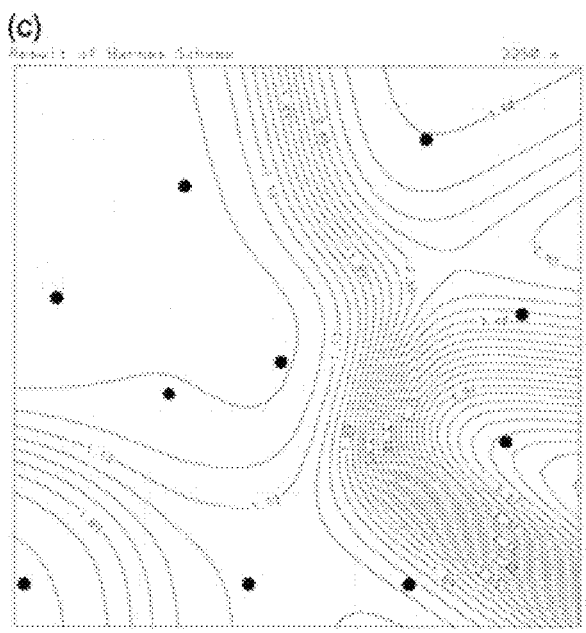
FIG. 10C

SYSTEMS AND METHODS FOR IMPROVED ATMOSPHERIC MONITORING AND GPS POSITIONING UTILIZING GNSS TOMOGRAPHIC REFRACTIVITY

FIELD

The disclosed technology relates to systems and methods for determining three-dimensional atmospheric and ionospheric density using refraction of electromagnetic waves. Improved atmospheric and ionosphere three-dimensional density fields are used to constrain errors in GNSS navigation devices, allowing more accurate estimate of location. Additionally, iterative improvements between three-dimensional refraction fields and GNSS locations provides improved atmospheric and space weather predictions, and improved GNSS location capabilities.

BACKGROUND

Global Navigation Satellite Systems (GNSS) are satellite systems that can include the United States' Global Positioning System (GPS), Russia's GLONASS, and the European Union's GALILEO. Such systems are used primarily in navigation applications, for example, to determine receiver positioning. GPS has been in operation since 1978 (globally since 1994) and was initially developed to provide precise positioning for military purposes. Today, GNSS systems are used for many civilian and military applications including navigation, surveying, time referencing, geo-fencing, weather data, self-driving cars, etc.

As the GNSS electromagnetic signals traverse the intervening distances from satellites in orbit to various receivers, the signals can be refracted due to the negatively charged ionosphere, moisture in the atmosphere, and the mass of the dry atmosphere. Such refraction can create errors in positional accuracy of GPS trilateration. Previous GNSS stations utilize mapping functions to determine the appropriate dry atmosphere delay for signals arriving at different angles above the horizon. These mapping functions generally use an estimate, such as surface pressure, to calculate the amount of mass traversed for any angle. In addition, the error introduced by the ionosphere can be relatively large when the satellite is near the observer's horizon, when the vernal equinox is near, and/or when sunspot activity is severe. Error can also be introduced by non-uniform moisture content in the atmosphere. The corresponding positional errors can vary as a function of weather, magnetic activity, location, time of day, direction of observation, temperature, atmospheric pressure, etc.

A need exists for improved systems and methods to address such challenges.

BRIEF SUMMARY

Some, or all, of the above needs may be addressed by certain embodiments and implementations disclosed herein.

Certain implementations of the disclosed technology may include a method of receiving, at a processing system, and from a plurality of Global Navigation Satellite Systems (GNSS) stations, navigation data corresponding to computed positions of the plurality of GNSS stations. The method can include receiving, at the processing system, GNSS transmitter information including one or more of: GNSS satellite positional information; GNSS clock information; and GNSS transmission frequency information. The method can further include: determining, based at least in part on the received navigation data and the received GNSS transmitter information, ionosphere and atmosphere refractivity associated with navigation data; determining, based at least in part on the refractivity, three-dimensional (3D) density states of the atmosphere and ionosphere corresponding to intersections of two or more GNSS signals; calculating, by the processing system, and based on the determined 3D density states, data fields of a model representing the three-3D density states; and transmitting position adjustment data to calibrate a navigation position of at least one of the plurality of the GNSS stations based at least in part on the calculated data fields of the model.

According to another example implementation, a satellite constellation communications system is provided, which may include a central command and control system configured for communication with at least one satellite associated with a constellation, and by at least one ground station. The system may include at least one memory for storing data and computer-executable instructions, the at least one memory including a resource database configured for storing knowledge data corresponding to a plurality of components associated with the satellite constellation communications system, wherein the plurality of components include the at least one satellite associated with the constellation. The system may include at least one processor in communication with the at least one memory, wherein the at least one processor is further configured to execute the computer-executable instructions to cause the system to: receive, at the processing system, GNSS transmitter information including one or more of: GNSS satellite positional information; GNSS clock information; and GNSS transmission frequency information. The at least one processor is further configured to: determine, based at least in part on the received navigation data and the received GNSS transmitter information, ionosphere and atmosphere refractivity associated with navigation data; determine, based at least in part on the refractivity, three-dimensional (3D) density states of the atmosphere and ionosphere corresponding to intersections of two or more GNSS signals; calculate, based on the determined 3D density states, data fields of a model representing the three-3D density states; and transmit position adjustment data to calibrate a navigation position of at least one of the plurality of the GNSS stations based at least in part on the calculated data fields of the model.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 10A shows a horizontal plot of specific humidity (g kg$^{-1}$) for the nature run from the April QNH case.

FIG. 10B shows a horizontal plot of specific humidity (g kg$^{-1}$) for 3DVAR.

FIG. 10C shows a horizontal plot of specific humidity (g kg$^{-1}$) for Barnes analysis at the 3250-m level.

DETAILED DESCRIPTION

Figure 1:
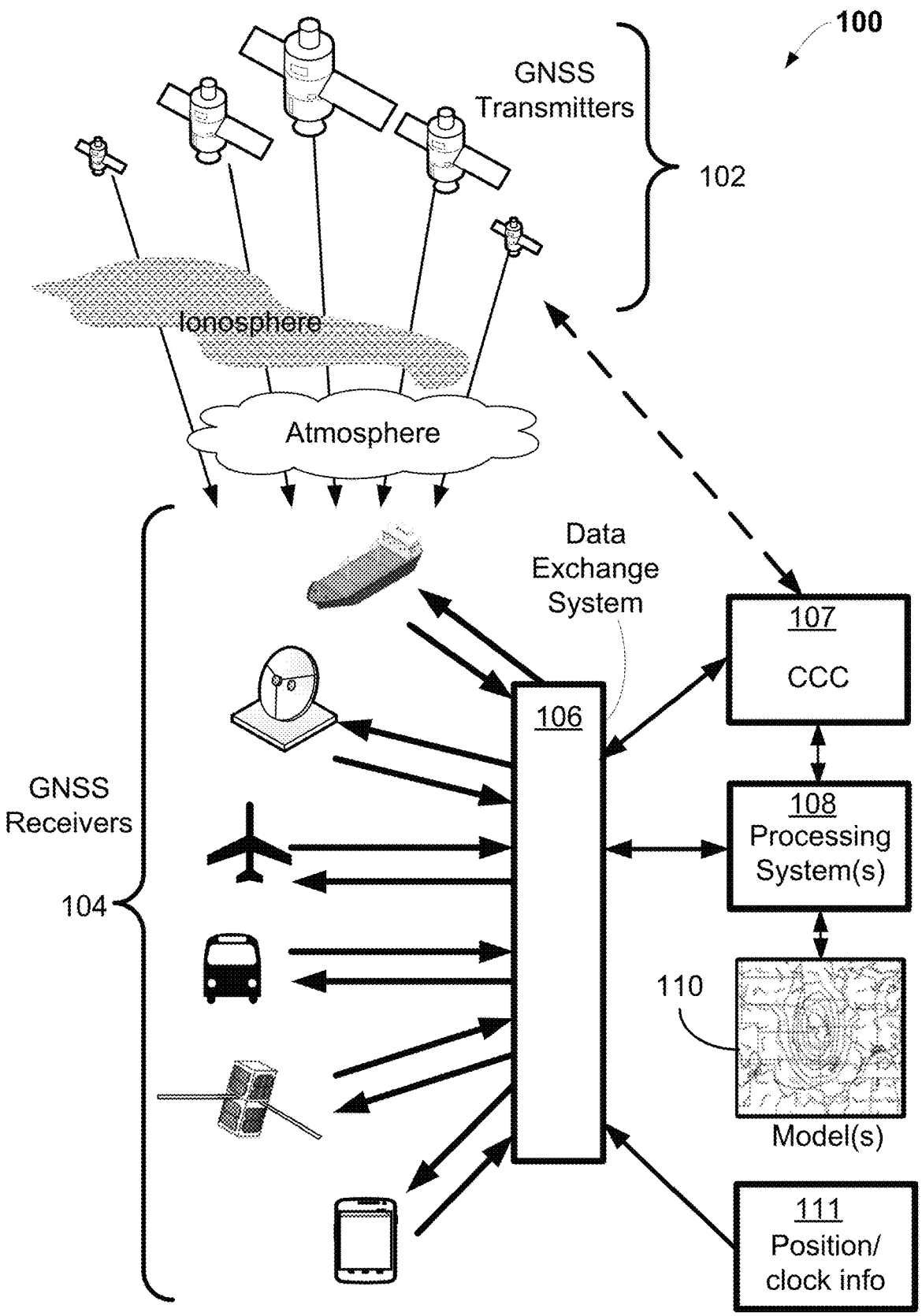
FIG. 1 depicts a block diagram representation of an example GNSS system 100 according to an example implementation of the disclosed technology.

Some implementations of the disclosed technology will be described more fully hereinafter with reference to the accompanying drawings. This disclosed technology may however, be embodied in many different forms and should not be construed as limited to the implementations set forth herein. Some of the components illustrated in the accompanying figures are shown for illustration purposes only, and may or may not be drawn to scale. In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and/or circuitry have been described at a relatively high-level, without detail, to avoid unnecessarily obscuring aspects of the present teachings.

The disclosed technology generally relates to systems and methods for determining static and/or dynamic three-dimensional density states of ionospheric electrons and atmospheric mass (hereinafter, referred to "3D density states") using received GNSS electromagnetic signals that traverse through these mediums. Certain implementations extend and improve earlier work entitled "Diagnosis of Three-Dimensional Water Vapor Using a GPS Network," by MacDonald et al., Monthly Weather Review, Vol. 130, pp. 386-397, 2002, incorporated herein by reference as presented in full.

Prior GNSS systems utilize mapping functions to approximate an appropriate delay for GNSS signals arriving at GNSS stations from different angles above the horizon. Such mapping functions generally use an estimate, such as surface pressure, to calculate the amount of mass traversed for a given angle, and the density is assumed to be horizontally uniform at all levels around the receiver, which is a false simplifying assumption leading to a previously acceptable degree of error in device location.

Certain example implementations of the disclosed technology measure the density delay of the GNSS signals as caused by the ionosphere and/or atmosphere, recognizing that the mass is not horizontally uniform. Certain example implementations utilize the density delay to determine the non-uniformity, leading to a better estimate of the 3D density state.

Certain implementations of the disclosed technology may utilize new measurement, analysis, and/or feedback techniques to improve the accuracy/resolution of the determined 3D density states. Certain implementation may be further configured to provide additional information, such as momentum in three directions, temperature, and pressure. For example, a significant increase in the number of (and improved utilization of) measurements may provide enhanced information about the 3D density states, which can provide improvements in weather prediction. The disclosed technology can apply to very short-range time-scale events (such as tornados and flash floods), medium-range time-scale events (such as snowstorms and hurricanes), and/or long-range time-scale events (such as droughts and heat waves).

In certain example implementations, the improved information about the 3D density states may be utilized to correct for refractive delays to reduce errors in positional accuracy of navigational systems, as will be further discussed below.

Certain example implementations of the disclosed technology may utilize two-way feedback to improve knowledge of the 3D density states. In certain example implementations, information identifying a transmitter's location, together with the determined refraction-related delays of the received signals may reduce inaccuracies of the 3D density states. Therefore, as the 3D density states are better known, such information can create better estimates of refractive effects for receivers in a large, proximate geographic region, which then may constrain the location error and further improve the estimate of the 3D density states. This continual iteration between 3D density states and location information may enable very high-resolution weather prediction models to extend improved state knowledge into the future, resulting in better estimates for future geo-location determination. According to an example implementation of the disclosed technology, continual feedback and iteration may be utilized to improve weather prediction and geo-location.

FIG. 1 depicts a block diagram representation of an example GNSS system 100 according to an example implementation of the disclosed technology. The system 100 can include a plurality of GNSS transmitters 102 deployed into orbit. For example, the GNSS transmitters 102 may be installed on GNSS satellite constellations, such as United States' Global Positioning System (GPS), Russia's GLONASS, the European Union's GALILEO systems, etc. In certain example implementations, the system 100 includes a plurality of GNSS stations 104 configured with GNSS stations. The GNSS stations 104, for example, may be mounted on ships, fixed terrestrial monuments, airplanes, vehicles, CubeSats, mobile GPS receivers, mobile computing devices, cell phones, smartphones, etc. GNSS signals originating from the transmitters 102 may traverse the ionosphere and atmosphere and may be detected and processed by the receivers 104. In certain example implementations, at least a portion of the receivers 104 may be configured for two-way communication with a data exchange system 106.

Since the effective refractive indices of the ionosphere and the atmosphere are non-uniform, and dynamically changing as a function of local electron density and water vapor content, the various GNSS signals undergo different refraction-related delays, depending on the relative positions of the transmitters, receivers, and intervening media through which the signals traverse.

In accordance with certain example implementations of the disclosed technology, the various calculations may be done in the data exchange system 106, the command and control center (CCC) 107, and/or the processing system(s) 108. For example, the calculation of refraction-related delay may utilize highly accurate position and clock information 111 for the GNSS satellite constellation 102. Such position and clock information 111, for example, may be available from services provided by Precision Point Position companies. In certain example implementations, the CCC 107, and/or the processing system(s) 108 may also compute updated analysis of the atmosphere and ionosphere that is communicated back to receivers in the GNSS stations 104 to improve their location.

In certain example implementations, the data exchange system 106 may be in communication with a command and control center (CCC) system 107, for example, to receive information about the GNSS transmitters 102, such as position, clock information, broadcast frequencies, etc. According to an example implementation of the disclosed technology, the data exchange system 106 may be in communication with one or more processing systems 108 configured with special-purpose software that instructs one or more processor(s) of the system 108 to analyze and/or assimilate the data received by the CCC system 107 and the GNSS stations 104 via the data exchange system 106.

In certain example implementations, the data exchange system 106 may receive information about the GNSS transmitters 102 (such as position, clock information, and/or broadcast frequencies) from one or more of the GNSS stations 104, as appropriate.

In certain example implementations, the analysis/assimilation carried out by the processing system 108 may be used to produce one or more models 110 representing the 3D density states of the ionosphere and/or atmosphere. According to an example implementation of the disclosed technology, the determined 3D density states may be continuously updated (via the model 110) as new information becomes available.

In accordance with an example implementation of the disclosed technology, the data exchange system 106 and/or the processing system 108 may be utilized to provide feedback from the model 110 to at least a portion of the receivers 104, for example, for calibration, derived positional corrections, refined local weather events, predictions, etc. In certain example implementations, the system 100 may be utilized to continuously refine the information represented by the model 110. In certain example implementations, the feedback sent back to the receivers 104 may be processed/utilized by the receivers 104 to reduce positional errors, for example, due to GNSS signal delay errors caused by the corresponding variations in the ionosphere and atmosphere.

As indicated by the double arrows between the receivers 104, the data exchange system 106, the CCC system 107, and the processing system(s) 108 data may be passed in both directions. For example, delay and/or location computed at the GNSS stations 104 may be transmitted via the data exchange system 106 to the processing system 108, which may be used in conjunction with GNSS transmitter 102 positional, clock, and/or frequency information to update the model(s) 110. In certain example implementations, three and four-dimensional atmospheric states (including predictions) may be fed back from processing system 108 to the GNSS stations 104 to improve their location accuracy.

The continual iterative process as disclosed herein may be utilized to improve the weather and ionospheric models 110 by using "density delay distances" (explained below) to better estimate the initial states (i.e. three-dimensional densities).

The densities, together with suitable assumptions (such as a hydrostatic atmosphere) enables derivation of the complete dynamic state of the atmosphere, including winds, temperature and pressure. Accordingly, the processing system 108 may use these observations, and other data sources such as GNSS radio occultation soundings and other global weather data, to refine the atmospheric state. The initial state of the atmosphere and ionosphere can be used together with a neutral atmosphere and space weather prediction model to project data forward a short time (e.g. 5 to 60 minutes), generating a new, slightly different state. In accordance with an example implementation of the disclosed technology, the estimate of future state may be fed back to the GNSS stations 104, allowing more accurate constraints on errors caused by dry atmosphere and volume electron content, resulting in better location estimates. Such a system could bring average errors to less than a centimeter, which makes the data being fed back to the central processor more accurate.

Figure 2:
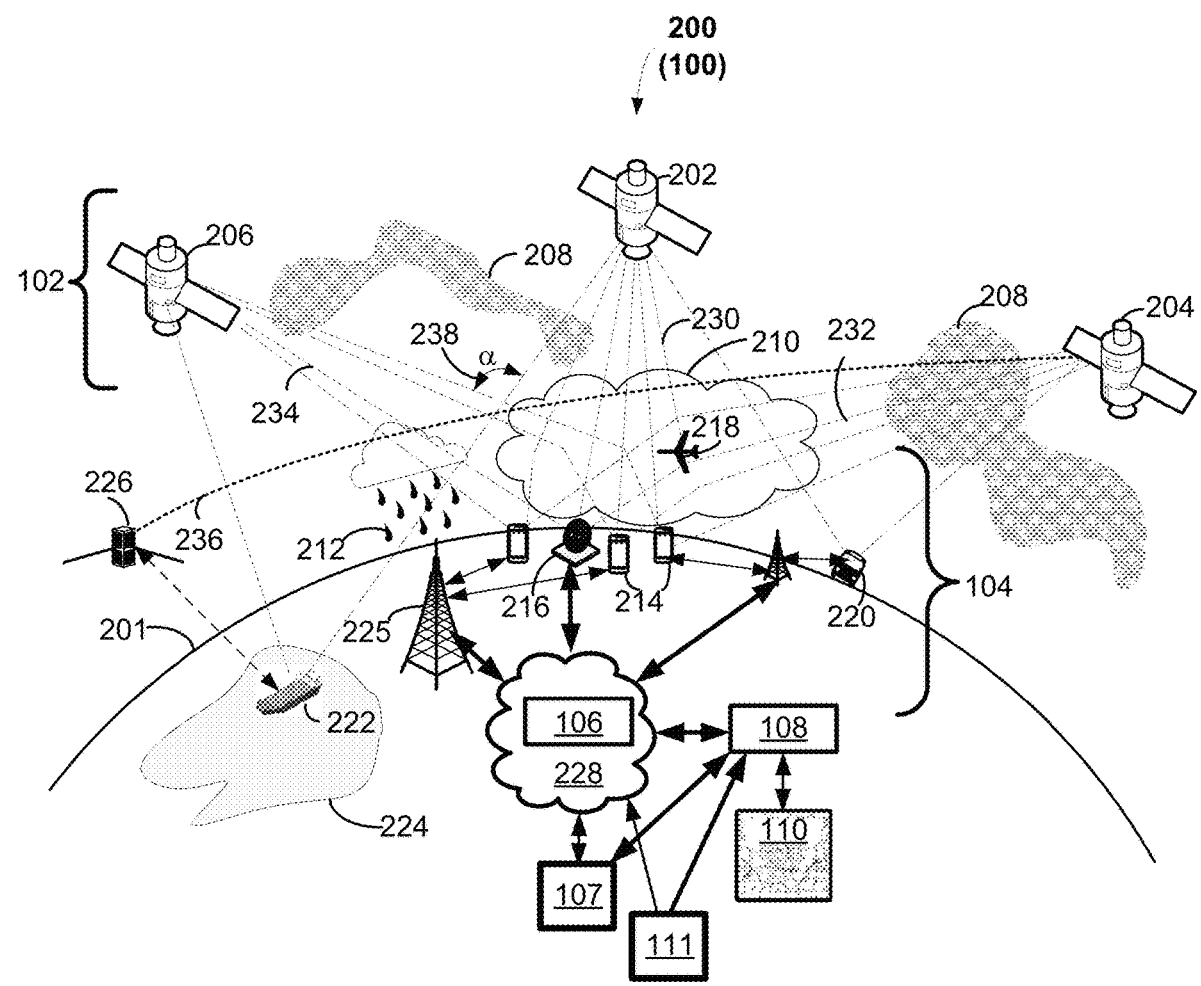
FIG. 2 depicts an example GNSS system 200 (not to scale) relative to earth 201 with associated orbital (226), airborne (218), oceanic (222), and earthbound (214, 216, 220) GNSS stations 104.

FIG. 2 depicts an example GNSS system 200 (not to scale) relative to earth 201 with associated orbital (226), airborne (218), oceanic (222), and earthbound (214, 216, 220) GNSS stations 104. The GNSS system 200 may include all or a portion of the GNSS transmitters 102, GNSS stations 104, data exchange system 106, CCC 107, processing system 108, and model 110 as discussed above with respect to the GNSS system 100 of FIG. 1. The associated GNSS signals 230, 232, 234 from the corresponding GNSS transmitters 202, 204, and 206 are illustrated in FIG. 2 as having localized refraction "bends" in the rays as higher refractive index media in the atmosphere is encountered, however, this is simplified for illustration purposes only, as the actual refraction may be less pronounced, and/or distributed over longer distances.

In accordance with an example implementation of the disclosed technology, the data exchange system 106 may include and/or may be in communication with a network 228, such as the internet, etc. According to certain example implementations, the network 228 may include and/or be in communication with one or more cell towers 225 configured for communication with the mobile GNSS stations 214, terrestrial vehicular GNSS stations 220, etc. In certain example implementations, the fixed GNSS stations 216 may be in communication with the network 228.

In an example implementation, the transmitters 102 may be associated with constellation satellites, such as United States' Global Positioning System (GPS), Russia's GLONASS, the European Union's GALILEO systems, etc. In an example implementation, a first GNSS satellite transmitter 202 may transmit a first GNSS signal 230, which may traverse through the ionosphere 208 (having non-uniform electron density) and the atmosphere 210 (having non-uniform dry mass 212), each of which can vary by time and relative positioning with respect to the signal 230. Accordingly, the first transmitted GNSS signal 230 may be received by one or more GNSS stations 104, which can include mobile GNSS stations 214, fixed GNSS stations 216, airborne GNSS stations 218, terrestrial vehicular GNSS stations 220, shipping GNSS stations 222 at sea 224, CubeSat radio occultation receivers 226, etc.

With continued reference to FIG. 2, and in an example implementation of the disclosed technology, additional GNSS satellite transmitters (such as a second GNSS satellite transmitter 204, and/or a third GNSS satellite transmitter 206, etc.) may also transmit their corresponding GNSS signals (such as a second GNSS signal 232 from the second GNSS transmitter 204, a third GNSS signal 234 from the third GNSS transmitter 206, etc.), which may be received by one or more of the GNSS stations 104.

In accordance with an example implementation of the disclosed technology, the system 200 may include a CubeSat GNSS radio occultation receiver 226 configured for use with s GPS Radio Occultation (GNSS-RO) system. GNSS-RO is a technique for measuring properties of the Earth's atmosphere from space, and it can be used for weather forecasts, climate modeling, and space weather prediction, as described in U.S. Patent Publication No. US2015/0192696, the contents or which are incorporated herein by reference as if presented in full.

A GNSS-RO receiver 226, for example, can receive a radio signal 236 transmitted by a GNSS satellite (such as depicted by the second GPS satellite transmitter 204) in medium Earth Orbit. Depending on the density of the ionosphere and atmosphere through which the transmitted signal 236 travels, the transmitted signal 236 can be "bent" towards the earth 201 and slowed down to travel a longer path both spatially and temporally through the ionosphere/atmosphere, and the bending angle can be calculated based on the delay in the signal's arrival. The bending angle and density-induced delay can be used to calculate the ionospheric/atmospheric density along the signal's path, which in turn can be used to calculate temperature, pressure, humidity and electron density.

With continued reference to FIG. 2, and in an example implementation of the disclosed technology, the combination of GNSS received rays 230, 232, 234 crossing in different somewhat orthogonal directions, allows tomographic recovery of the 3D density states, as discussed above. In certain example implementations, the received, refractivity signals are assimilated by the processing system 108 to determine the atmospheric mass and ionospheric electron density.

Traditionally, tomography has been utilized as a technique to determine the three-dimensional structure of an object by measuring attenuation of multiple penetrating waves. For example, in three-dimensional medical tomography, an electromagnetic wave (typically an x-ray) is transmitted through a biological object, and total signal attenuation along each ray is measured. When the media is probed from many different angles, a two or three-dimensional portrayal of the interior structure (e.g. internal bones and organs) can be mathematically derived.

Certain example implementations of the disclosed technology utilize a new form of tomography in which the refraction of the signal is utilized (rather than attenuation) to determine the internal structure of the medium.

Refraction is defined as a change in direction of wave propagation due to a change in its associated transmission media. For example, as an electromagnetic wave propagates through media having different refractive indices, the phase velocity of the wave is changed but its frequency remains constant. The refractive index of a media is defined as:

$$n = \frac{c}{v},$$

where c is the speed of light, and v is the velocity of the electromagnetic wave through the media. Thus, in a vacuum, the refractive index is n=1 since v=c. The index of refraction for air at pressure of one atmosphere is 1.000293, with an associated electromagnetic wave velocity through air expressed as:

$$v_{air} = \frac{c}{1.000293} \cong 299,700 \ \frac{\text{km}}{\text{s}},$$

or about 90 km/s slower than the speed of light in a vacuum. When electromagnetic waves traverse from a first media having a first refractive index $n_1$ and are incident at a first angle $\theta_1$ with respect to normal incidence at an interface of a second media of refractive index $n_2$, the emerging wave is bent travels through the second media at a second angle $\theta_2$ with respect to normal according to Snell's Law:

$$\frac{n_1}{n_2} = \frac{\sin \theta_2}{\sin \theta_1}.$$

It is common to define another index, N, referred to as refractivity and defined as:

$$N = 10^6(n-1).$$

The refractivity N can be expressed as a sum of the various contributing components, including the dry atmosphere density, water vapor density, liquid water content, and ionosphere electron density. For GNSS satellite electromagnetic waves, the refractivity may be expressed according to the expressions:

$$N \cong dry + wet + liquid + ion,$$

with the corresponding terms expressed as:

$$N = 222.76\, \rho_a + 1.72 \times 10^6 \left(\frac{\rho_v}{T}\right) + 1.4 \times 10^{-3} W_L + 4.03 \times 10^7 \frac{d_e}{f^2},$$

where:
$\rho_a$=atmospheric density in kg/m³;
$\rho_v$=water vapor density in kg/m³;
T=atmospheric temperature in Kelvin
$d_e$=electron density (ions per m³);
f=transmitter frequency in Hz; and
$W_L$=liquid water droplet density in kg/m³.

In accordance with an example implementation of the disclosed technology, the refraction of GNSS signals caused by the "dry" and "ion" terms may be utilized to recover the 3D density states for those substances. In an example implementation, the "liquid" term due to water droplets are negligible at electromagnetic wavelengths used by GNSS and can be eliminated from the calculation. According to an example implementation of the disclosed technology, the "wet" (water vapor) term can be subtracted from the integrated refractivity N to estimate the contribution of the other two remaining terms: "dry" and "ion," for which the "ion" term may be separated using two different L-band signals, as will be explained below.

Accordingly, and in an example implementation of the disclosed technology, the effects of intervening media on the GNSS electromagnetic waves to determine the integrated refractivity N may be characterized by accurately measuring the distance that a media-modified wave is reduced in a period. For example, as the wave velocity is slowed down and/or bent by the ionosphere and atmosphere, it does not reach the same point that it would reach in a vacuum in a given amount of time. The delayed distance difference between where the wave would be in a vacuum, versus where it actually is, can be inferred accurately by utilizing clocks in the receivers. This delayed distance is herein referred to as the "density delay distance," abbreviated as D3. In certain example implementations, the D3 may be represented as a time delay. As defined herein, the term "density delay information" may include time delay and/or distance delay due to refractive effects of the atmosphere and ionosphere.

In accordance with an example implementation of the disclosed technology, the D3 may be calculated in real-time using known locations and clock corrections for the GNSS satellites. In another example implementation, information about the locations and clock corrections for the GNSS satellites may be obtained, for example, by via a command and control center (CCC) 107 (or via a service that provides satellite position and clock information 111 as previously described) and such information may be communicated to and processed by the processing system 108 for more precise satellite location and/or clock correction information.

The GPS system utilizes at least 24 satellites in a constellation having an orbital altitude of 20,180 km. Each satellite in the GPS constellation broadcasts signals over the L1 (1.57542 GHZ), L2 (1.2276 GHZ), and L5 (1.17645 GHz) frequencies. The transmitted signals are encoded with the corresponding satellite's orbital position and time of transmission, with synchronization of the constellation maintained by atomic clocks. A receiver compares the time of broadcast encoded in the transmission of three or more different satellites, allowing the receiver's position to be calculated using trilateration based on the corresponding time-of-flight delays of each received signal. In accordance with certain example implementations, the system (100 and or 200) may augment the GNSS satellite position and clock information 111 obtained from a precise positioning service with the three-dimensional density fields of atmospheric mass, moisture and electron density to achieve a more accurate position. In certain example implementations, this calculation may be done at the central processor 108, and may or may not be transmitted back to any particular GNSS station having a receiver.

A consequence of the dispersive nature of the ionosphere is that the apparent time delay for a higher frequency carrier wave is less than it is for a lower frequency wave. That means that L1 (1.57542 GHZ) is not affected as much as L2 (1.2276 GHZ), and L2 is not affected as much as L5 (1.17645 GHz). In accordance with an example implementation of the disclosed technology, the separation between the L1, L2, and/or L5 frequencies may be utilized to facilitate an estimation of the ionospheric group delay to determine the "ion" term, as discussed above. In certain example implementations, multiple-frequency receivers may track the carrier frequencies to determine the total electron content, which has a frequency dependence given by:

$$TEC \cong \frac{\Delta t * c * f^2}{40.3},$$

and where:
TEC=the total electron content per square meter;
f=transmitter frequency in Hz;
$\Delta t$=the time delay; and
c=the speed of light in m/s.

In accordance with an example implementation of the disclosed technology, the availability of TEC along a large number of intersecting paths allow a tomography calculation of the three-dimensional electron density of the ionosphere. The availability of the three-dimensional electron content of the ionosphere allow GNSS station receivers that do not have the two frequencies needed to estimate TEC to use the ray path through the ionosphere to estimate the D3 due to TEC. Thus, certain example implementations of the disclosed technology may enable inexpensive receivers in GNSS stations to have significantly higher accuracy than would be otherwise possible.

In one example implementation, the TEC may be calculated via a processor associated with the local receiver 104. In this implementation, the precise satellite location and clock corrections may be obtained via the data exchange system 106. In certain example implementations, the local receiver 104 may transmit data to a processing system 108 via the data exchange system 106, where corrections are available to do the D3 calculations. In certain example implementations, data flow may be optimized for the particular communication path, associated processors, etc.

As previously indicated, prior GNSS systems may utilize so-called "mapping functions" to approximate delays for GNSS signals arriving at GNSS stations from different angles above the horizon. Such mapping functions make a simplifying assumption that the density is horizontally uniform at all levels around the receiver, which can lead to errors in the computed location of the device.

Consider a scenario where GNSS signals are detected by a surface receiver. For example, a signal transmitted by a GNSS satellite at the zenith (directly above the receiver) could have a D3 of approximately 2.1 meters. A signal transmitted by a GNSS satellite at 45 degrees (with respect to zenith) from the west would have a D3 of about 2.97 meters. If the air temperature were uniform, a signal transmitted by a GNSS satellite at −45 degrees (with respect to zenith) from the east would have a similar D3 of about 2.97 meters. However, if the air to the east of the receiver is much colder, and denser, it could make the corresponding D3 about 3.02 meters, or 5 cm longer than the D3 measured from the west due to the integrated density difference.

Certain example implementations of the disclosed technology may utilize very accurate receivers that can measure the time within the carrier phase signal to determine D3 to within about a centimeter of root mean square accuracy. For GNSS stations that have the atmosphere and ionosphere as intervening media, if the angle between the in-situ receiver and the GNSS satellite is greater and 15 degrees above the horizon, the bending effect can be ignored. For signals coming in a low angle, the bending of the wave creates a longer path length, which are included in the D3 calculation.

Certain example implementations of the disclosed technology utilize iterative ray tracing of GNSS signals to determine D3 with extremely high accuracy. Certain example implementations may improve navigational positioning accuracy by measuring the intervening media and/or making higher accuracy estimates of the associated density.

Experiments confirm that GNSS signals may be utilized to determine the three-dimensional density of dry air in the atmosphere. Furthermore, water vapor in the lower atmosphere can be determined by using minimization techniques. Certain example implementations of the disclosed technology may calculate a density delay due to electrons via differential delay between the L1 and L2 band frequencies used by GNSS constellations, as discussed above. Certain example implementations of the disclosed technology derive all three (dry, wet, ion) fields using variational assimilation techniques. In certain example implementations of the disclosed technology, the atmospheric dynamic fields may be calculated by removing the D3 effect of electron density before the assimilation. Briefly described, the assimilation system arrives as a three-dimensional field by minimizing the difference between the D3 observations and the iterated three-dimensional fields using numerical variational techniques. Such minimization, variational assimilation, and numerical techniques are discussed in "Atmospheric Modeling, Data Assimilation and Predictability," Kalney 2003, Cambridge University Press, the contents of which are incorporated herein by reference, as if presented in full.

Certain example implementations of the disclosed technology utilize large numbers of receivers 104. In one example implementation of the disclosed technology, 5-10 receivers 104 are utilized to improve the accuracy of the 3D density states. In another example implementation, 11-50 receivers 104 are utilized. In another example implementation, 51-100 receivers 104 are utilized. In yet another example implementation, 101-1000 receivers 104 are utilized.

As an illustration of large numbers of observations, consider a 1000 km by 1000 km domain over populated advanced countries like the US or Europe. Such a domain could have about 200 Radio Occultation observations, a couple of hundred aircraft observations and a couple of thousand surface based observations. The scale of hourly weather that affects GNSS and prediction can be estimated as about 100 km by 100 km. Such a domain would have a couple hundred observations, which would allow horizontal and vertical characterization of the weather phenomena of importance. According to an example implementation of the disclosed technology, the more receivers 104 that are utilized in the determination of the 3D density states, the more accurate the model becomes.

As previously discussed, certain example implementations of the disclosed technology may share certain similarities with medical tomography, in which an x-ray generation device rotates around a patient such that the x-rays traverse through the patient's tissue in many different directions, and from which a tomogram may be reconstructed from the detected transmissions.

In accordance with certain example implementations of the disclosed technology, different receivers may be utilized to receive the different signals arriving from different directions by different satellites to perform the tomography. For example, in the technique of Radio Occultation, a GNSS satellite signal 236 may be transmitted by a GNSS satellite 204 and received by another satellite 226 after a dominantly horizontal traverse through the atmosphere. In certain example implementations of the disclosed technology, surface receivers such as ships 222, automobiles 220, fixed ground based devices 216, mobile devices 214, unmanned aerial vehicles and other aircraft 218, etc., may receive predominantly vertical signals (such as may be received from an overhead GNSS satellite 202). Thus, the horizontal Radio Occultation signals and the vertical in-situ signals may be approximately orthogonal, and may provide the necessary delay information for constructing the 3D density states. Furthermore, location information may be transmitted from at least a portion of the receivers 104 to the processing system 108 for additional data to further reduce errors. The relative position of the different receivers 104 with respect to the GNSS transmitters 102 may create multiple crossings from different directions for horizontal domains within each level of the atmosphere.

In accordance with certain example implementations of the disclosed technology, GNSS signals from two or more GNSS transmitters 102 may cross or intersect at an angle α 238 and the intersection may define a location, volume, and/or region in the intervening space (i.e., in the ionosphere 208 and/or atmosphere 210) between the associated GNSS transmitters 102 and GNSS stations 104. According to an example implementation of the disclosed technology, the density state of the location, volume, and/or region (at and/or surrounding) the intersection may contribute to the same or similar density delay for the associated GNSS signals penetrating the same location, volume, and/or region. While an orthogonal intersection angle α 238 (i.e., 90 degrees) may prove ideal for precisely determining locations of ionospheric/atmospheric content associated with the density delay contributions, certain example implementations of the disclosed technology may utilize weightings to account for intersecting angles α 238 that are less than 90 degrees. In one example implementation of the disclosed technology, a trigonometric function, such as sin(a) may be utilized as weighting so that certain non-orthogonal crossing signals may still be utilized by the processing system 108, and incorporated into the model 110.

In accordance with certain example implementations of the disclosed technology, and as determined by developmental testing and experimentation, tomography using the techniques discussed herein may be sufficiently accurate when approximately 20 to 40 percent (or greater) of the rays cross at angles greater than 30 degrees.

In accordance with certain example implementations of the disclosed technology, the ionosphere 208 three-dimensional electron density structure may be determined in a similar way as discussed above with respect to the air density, and may have an additional advantage in that certain satellite 226 constellations may orbit within the ionosphere 208 itself. Specifically, satellites 226 in Low Earth Orbit are within line of sight of many GNSS satellites 102. In certain example implementations of the disclosed technology, such satellites 226 may be utilized measure the density delay distance (D3) from the GNSS satellites 102 at high temporal rates. The availability of such GNSS signals 236 that traverse near the surface of the earth 201 may enable the system 200 to use tomography to determine the difference between the part of the ionosphere 208 that is lower than the receiver satellite 226, and the part that is above the satellite 226. Since the satellites 226 are near the peak of ionospheric electron density, this is very helpful for the mapping of the electrons in the ionosphere 208. The rays emanating from all directions within the desired three-dimensional substance create a naturally orthogonal set. Again, discussed above, a the predominantly horizontal signals (such as those received via radio occultation satellite 226) combined with predominantly vertical signals (such as may be received from an overhead GNSS satellite 202) may be utilized for the determination of the 3D ionospheric electron density.

In accordance with certain example implementations of the disclosed technology, a feedback loop may be utilized between the GNSS stations 104 and the processing system 108 For example, the data exchange system 106 may be utilized to provide a two-way communication between at least a portion of the receivers 104 and the processing system 108, which may allow the GNSS stations 104 to have more accurate positioning without the simplifying assumption discussed above. In an example implementation, accurate mass density data can be fed back into GNSS stations 104 to provide enhanced location accuracy.

Certain example implementations of the disclosed technology may provide the technical effects of preventing rare but large location errors. For example, a projected safety standard for a driverless vehicle is that it should not stray outside of a one or two-meter locational accuracy more than once in a hundred years. Certain example implementations of the disclosed technology may help reduce and/or eliminate such location errors.

Numerical testing was utilized to validate the processes describe herein. For example, simulated GNSS signals received at different receivers were utilized to determine that the density states and atmospheric fields could be recovered. The numerical tests used current estimates of location accuracy and realistic errors. The tests were conducted for a domain consisting of the US 48 contiguous states, and areas immediately around that domain. Only dry atmosphere data was used for the initial validation tests, as it was assumed that the electron density component could be removeable via L-band differential frequency response, as described above.

During the validation testing, certain elements, factors, and specifications of the system 200 were identified for refinement and/or weighting. For example, it became apparent during testing that the ability to provide highly accurately density states depends on the measurement of nearly orthogonal GNSS signals in the constituent small volumes. In accordance with certain example implementations of the disclosed technology, the orthogonality of the received GNSS signals may be determined, with associated calculations weighted according to the crossing angles. In certain example implementations of the disclosed technology, weighting may also be used to account for the vertical and/or horizontal offset between received GNSS signals, as such offsets may define a larger constituent volume, and hence, less resolution in the measurements.

The validation testing also provided information about horizontal and temporal resolution that the system 200 may provide for a given density of receivers 104. For example, previous weather models typically assimilate data for 12 hours to create an initial state. However, it was determined that the systems and methods described herein could support more frequent data, and may be utilized to create a new state every hour, which may in turn enable hourly weather predictions. There are many cases in the Earth's atmosphere, mainly related to thunderstorms and convection, where the hourly changes in atmospheric density, water vapor and associated weather are quite rapid. In the last decade, weather models and analysis have shown that the use of hourly observations greatly improve prediction of these important phenomena. Since the density inhomogeneities can be large (several percent), the associated errors in location could also be large, especially for GNSS satellites at low angles. In certain example implementations, the three-dimensional density fields may significantly improve location accuracy in convective areas.

Additionally, the validation testing was utilized to provide information regarding the preferred use of aircraft 218 receiver data at heights to eliminate errors due to water vapor variability. For example, it was determined that data from aircraft at higher levels of the atmosphere (e.g. typical flight levels of 10 km) could be preferable since almost all water vapor is concentrated below 10 km. Additionally, it was determined that data taken during aircraft take-off and landing could be utilized in specifying the full atmospheric state. The validation testing confirmed that highly detailed weather prediction could be achieved via such observations.

In accordance with certain example implementations of the disclosed technology, a three-dimensional density field of the dry atmosphere, together with assumptions of various complexity may be made to lead to the full momentum and thermodynamic structure of the atmosphere and ionosphere. According to an example implementation of the disclosed technology, hydrostatic and balance assumptions may be utilized to create the full state.

Certain example implementations of the disclosed technology may utilize the methodology of Observing System Simulation Experiments (OSSEs), such as described in "Observing System Simulation Experiments at the National Centers for Environmental Prediction," by Masutani, M., et al. (2010), J. Geophys. Res., 115, D07101, doi:10.1029/2009JD012528, the contents of which are incorporated herein by reference as if presented in full. According to an example implementation of the disclosed technology, OSSE may utilize analysis and statistics techniques to estimate the atmospheric conditions using the system 200 described herein. Certain example implementations of the disclosed technology may use OSSE techniques to determine the extent to which the system 200 could improve weather forecasts and/or associated GNSS location data.

According to an example implementation of the disclosed technology, an OSSE process may start with a hypothetical "true" atmosphere over the experimental domain. In example embodiment, a low-pressure system may be defined that extends from the surface of the earth 201 into the stratosphere. In certain example implementations, it may be assumed that the dynamic fields, the associated directional momentum components, the density, and the temperature may vary over the same volumes. Conservative estimates may be made regarding the number of GNSS signals that could be received from surface, aircraft and satellite receivers 104.

In accordance with certain example implementations of the disclosed technology, the "true" atmosphere may be used to estimate the D3 for the incoming GNSS signals, based only on the dry air density. In an example implementation, and for the "first guess," a constant temperature and pressure may be utilized on each of the horizontal pressure levels, for example, from the earth surface (at approximately 1 bar) to the top level in the stratosphere (at approximately 5 millibar). In certain example implementations, the input fields of D3 from all available GNSS stations 104, together with the initial first guess may be iterated using a "relaxation" search to arrive at an approximate solution. In certain example implementations, empirically determined search coefficients (such as the D3 increment) may provide a robust system that can converge toward a good approximation of the solution representing the true atmosphere.

In one example experiment conducted, about 53,000 received D3 distances were utilized, from which about 21,000 were received from land, 22,000 from aircraft, and about 9,000 from satellite Radio Occultation. The associated calculated D3 densities from such measurements may be considered realistic for about a one-hour period over the 48-state domain. An average error of 2 cm was used for the receivers, using a random number generator to make realistic simulations of noise, which is a very conservative choice for errors, since it is believed average errors can be reduced significantly below the 2-cm level.

Figure 3A:
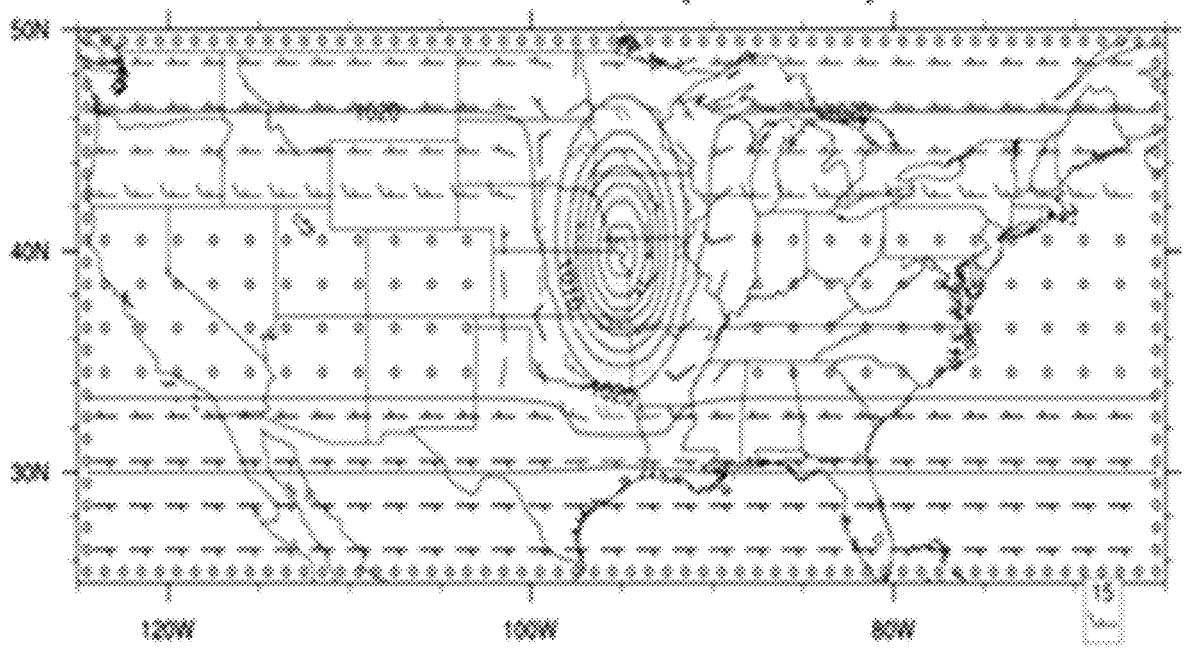
FIG. 3A shows an initial surface wind and pressure "true" field.
Figure 3B:
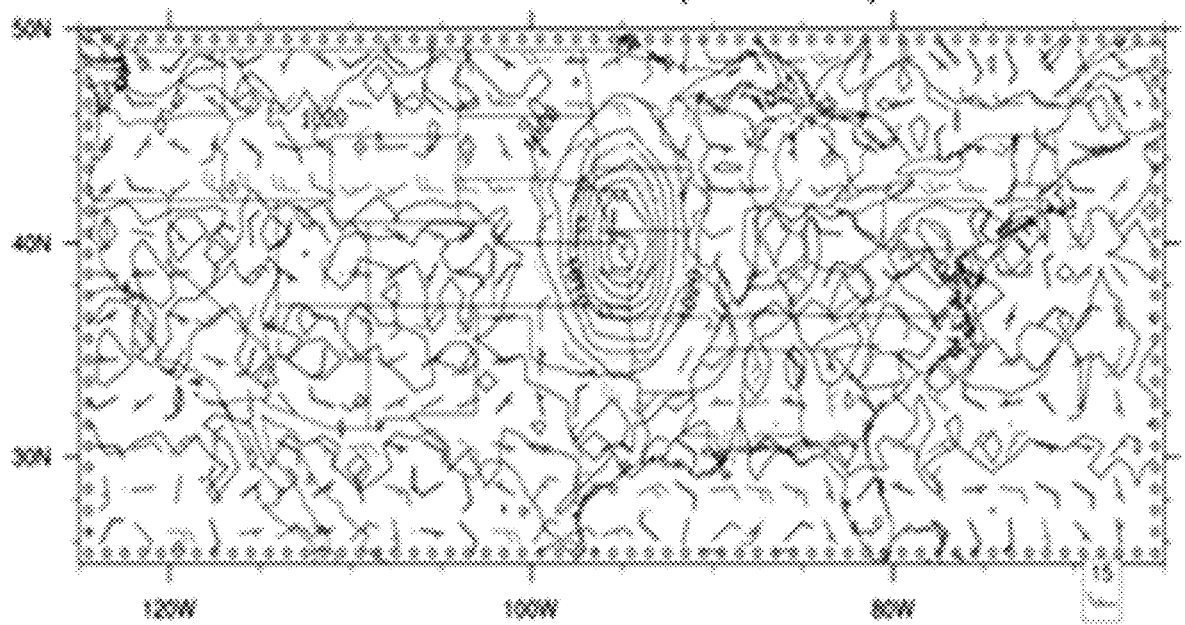
FIG. 3B shows calculated surface wind and pressure field from the Observing System Simulation Experiments (OSSEs) processes after a few hundred iterations.
Figure 4A:
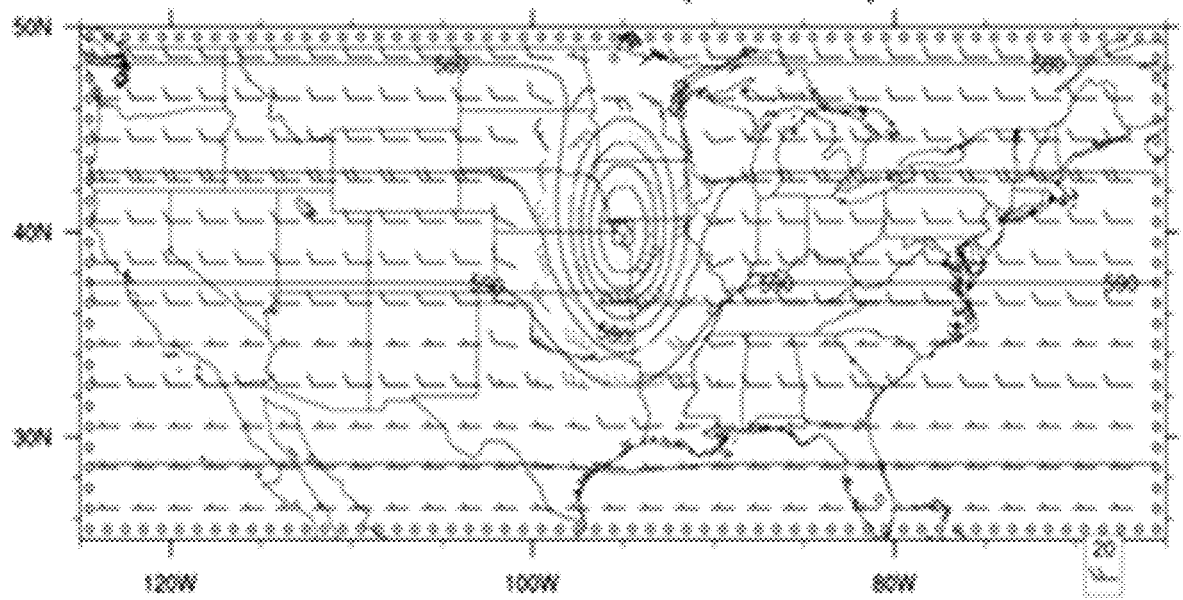
FIG. 4A shows an initial wind and pressure "true" field at 5 km elevation.
Figure 4B:
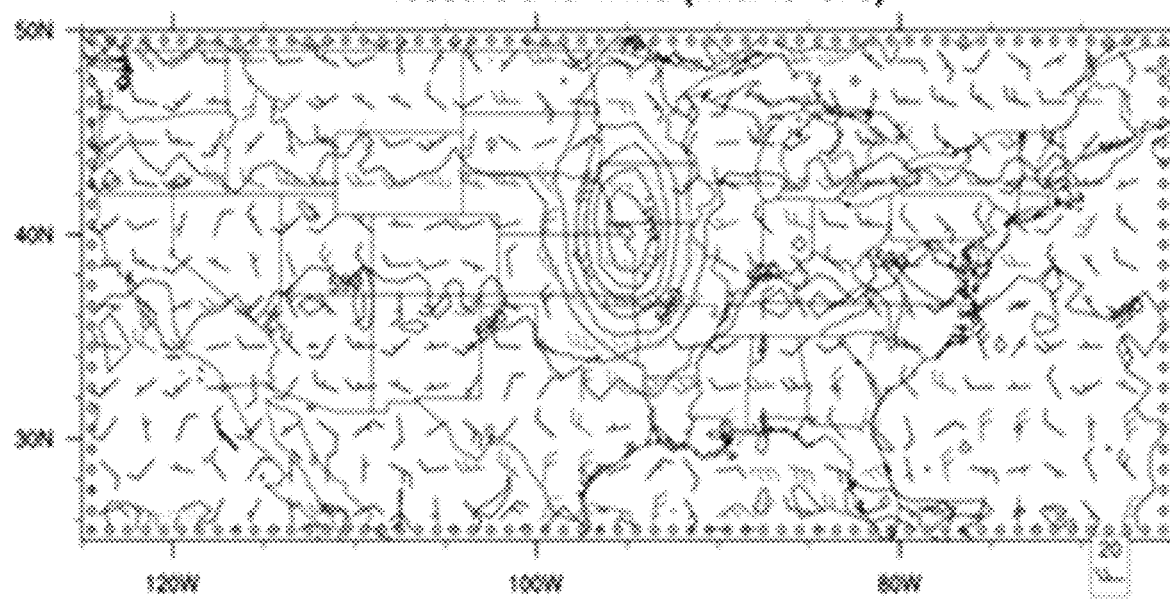
FIG. 4B shows calculated 5 km elevation wind and pressure field from the OSSEs processes after a few hundred iterations.

FIG. 3A shows an initial surface wind and pressure "true" field. FIG. 3B shows calculated surface wind and pressure field from the Observing System Simulation Experiments (OSSEs) processes after a few hundred iterations. FIG. 4A shows an initial wind and pressure "true" field at 5 km elevation. FIG. 4B shows calculated 5 km elevation wind and pressure field from the Observing System Simulation Experiments (OSSEs) processes after a few hundred iterations.

FIGS. 3A and 3B, and FIGS. 4A and 4B, for example, show results of the OSSE processes after a few hundred iterations, which took a few hours on a small PC. For example, FIG. 3A shows the initial surface wind and pressure "true" field, and FIG. 3B shows the field derived from the simulated D3 observations. The pressure and wind fields show a deep low in central US, with strong winds around it (no surface friction included). The low in the true field, as shown in FIG. 3A, is closely approximated by the low in the derived field, as shown in FIG. 3B. The random error inserted can be seen in the wind field away from the low, but the important structure is well duplicated at the surface by the experiments. FIGS. 4A and 4B show corresponding the pressure and wind fields at 5 km high in the atmosphere. For example, FIG. 4A shows the initial wind and pressure "true" field at 5 km, and FIG. 4B shows the field at 5 km derived from the simulated D3 observations. As demonstrated by these experimental simulation, the desired fields may be well recovered for the central US low using the techniques described herein, with random error perturbations added. The results of the OSSE experiments show that air density (and derived fields of wind, temperature and pressure) may be recovered from appropriately distributed D3 measurements. Certain example implementations may also be used for the recovery of three-dimensional electron density via a similar process using L-band differential measurements.

Figure 5:
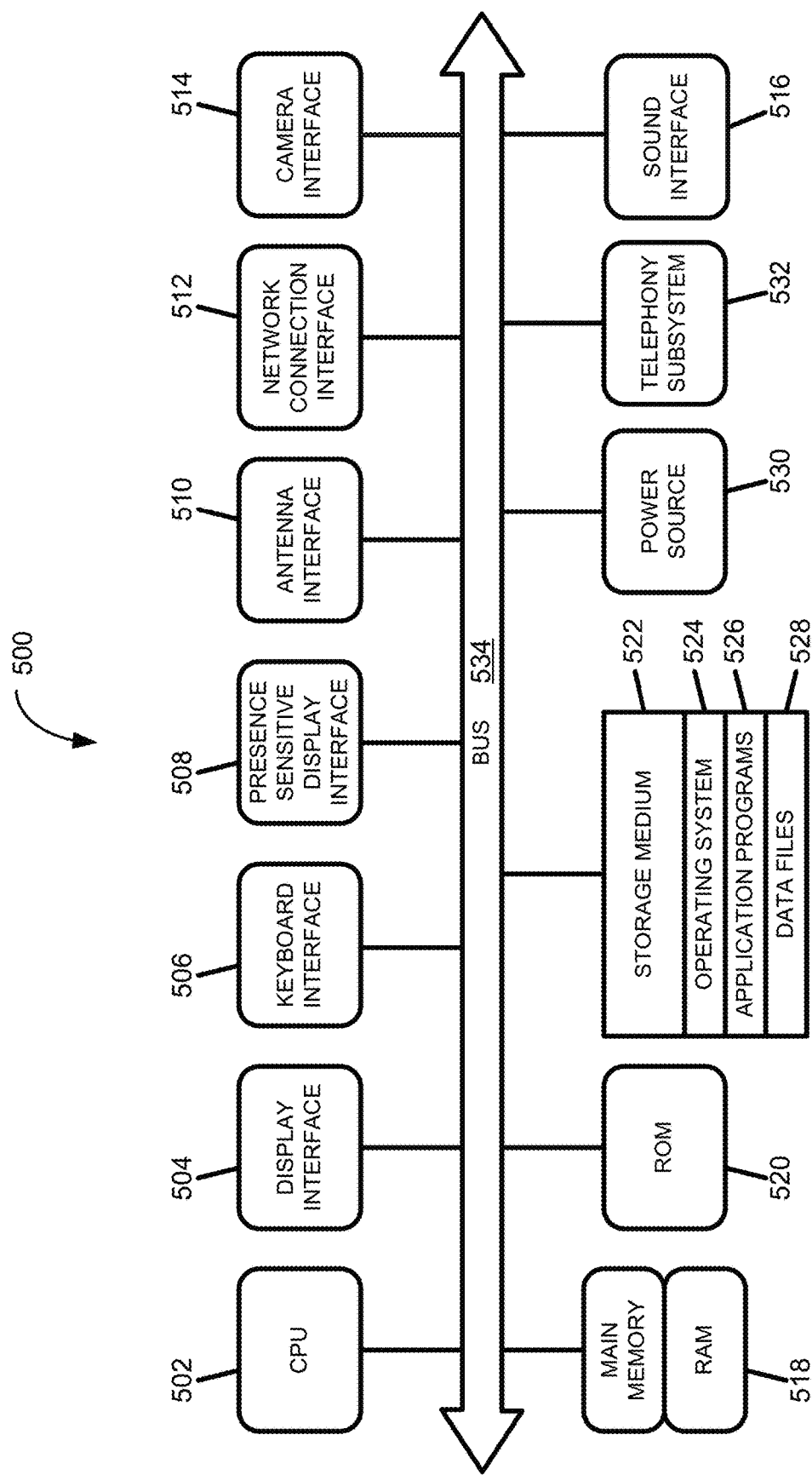
FIG. 5 depicts a block diagram of an illustrative computing device 500 according to an example implementation.

FIG. 5 depicts a block diagram of an illustrative computing device 500 according to an example implementation.

Certain aspects of FIG. 5 may be embodied in a transmitter, satellite, ground station, receiver, data exchange system, central command and control system, and/or associated processing system (for example, the satellites 202, 204, 206, transmitters 102, GNSS stations 104, CCC 107, data exchange system 106, processing system 108, etc., as shown in FIGS. 1 and/or 2). According to one example implementation, the term "computing device," as used herein, may be a CPU, processor, or conceptualized as a CPU (for example, the CPU 502 of FIG. 5). In this example implementation, the computing device (CPU) may be coupled, connected, and/or in communication with one or more peripheral devices, such as display. In another example implementation, the term computing device, as used herein, may refer to a processor and associated components, for example, that may be installed and reside on satellites in a constellation (such one or more satellites 202, 204, 206 as shown in FIG. 2).

In certain example embodiments, a satellite may have various sensors connected to and in communication with a CPU (such as the CPU 502 of FIG. 5). For example, the sensors can include one or more of the following: a frequency specific monitor such as UV (Ultraviolet) and IR (infrared), a sensor for remote detection of surface temperature, a spectrometer (UV and/or IR, for example), an accelerometer, a camera or vision system for still and video capture, a gravimetric sensor, a radar, and a radio transceiver, among other possibilities. In certain example implementations, a satellite may embody a computing device that includes memory (such as memory 518 depicted in FIG. 5) to store data collected by one or more sensors.

In an example implementation, the computing device may output content to its local display and may transmit and receive messages via the antenna interface 510, the network connection interface 512, telephony subsystem 532, etc. In example implementation, the computing device may output content to an external display device (e.g., over Wi-Fi) such as a TV or an external computing system. It will be understood that the computing device 500 is provided for example purposes only and does not limit the scope of the various implementations of the communication systems and methods.

The computing device 500 of FIG. 5 includes a central processing unit (CPU) 502, where computer instructions are processed. Certain example implementations can include a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured to provide content (for example, data, images, and other information as previously discussed) for an external/remote display that is not necessarily physically connected to the computing device 500. For example, a desktop monitor may be utilized for mirroring graphics and other information that is presented on a mobile computing device. In certain example implementations, the display interface 504 may wirelessly communicate, for example, via a Wi-Fi channel or other available network connection interface 512 to an external/remote display.

In an example implementation, the network connection interface 512 may be configured as a communication interface and may provide functions for rendering video, graphics, images, text, other information, or any combination thereof on the display. In one example, the computing device

500 may include a communication interface that may include one or more of: a serial port, a parallel port, a general-purpose input and output (GPIO) port, a universal serial bus (USB), a micro-USB port, a high definition multimedia (HDMI) port, a video port, an audio port, a Bluetooth™ port, a near-field communication (NFC) port, another like communication interface, or any combination thereof.

According to an example implementation of the disclosed technology, the computing device 500 may include a keyboard interface 506 that provides a communication interface to a keyboard. In one example implementation, the computing device 500 may include a pointing device interface 508 for connecting to a presence-sensitive input interface. According to certain example implementations of the disclosed technology, the pointing device interface 508 may provide a communication interface to various devices such as a touch screen, a depth camera, etc.

The computing device 500 may be configured to use an input device via one or more of input/output interfaces (for example, the keyboard interface 506, the display interface 504, the pointing device interface 508, the antenna interface 510, the network connection interface 512, camera interface 514, sound interface 516, etc.,) to allow capturing information into the computing device 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 500 or may be a separate device. For example, the input device may be an accelerometer, a magnetometer, a digital camera, a microphone, and/or an optical sensor.

Certain example implementations of the computing device 500 may include an antenna interface 510 in communication with an antenna. For example, certain satellites (such as the satellites as shown in FIGS. 1-2) may include one or more antennas with high gain capabilities. Certain example implementations of the antenna interface 510 can include one or more of: a receiver, analog-to-digital converter, sampler, buffers, memory, and memory. Certain example implementations can include a network connection interface 512 that provides a communication interface to a network. In certain implementations, a camera interface 514 may act as a communication interface to provide functions for capturing digital images from a camera. In certain implementations, a sound interface 516 may be provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 and content files 528 are stored. In accordance with certain example implementations of the disclosed technology, the application programs 526 can include one or more of programs to dynamically adjust the various parameters, such as one or more of: data packet size; data chunk size; data coding rate; number of re-transmits on uplink; number of tolerated timeouts; maximum transmission time; data compression parameters; bit rate factors; recovery factors; resource burden factors; batching; latency control; advance filtering; etc.

According to an example implementation, the computing device 500 includes a power source 530 that provides an appropriate alternating current (AC) or direct current (DC) to power components. According to an example implementation, the computing device 500 can include a telephony subsystem 532 that allows the device 500 to transmit and receive sound over a telephone network. The constituent devices and the CPU 502 communicate with each other over a bus 534.

In accordance with an example implementation, the CPU 502 has appropriate structure to be a computer processor. In one arrangement, the computer CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 to execute software programs. Content may be stored in the RAM 518, where the content may be accessed by the computer CPU 502 during execution. In one example configuration, the device 500 includes at least 128 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500 or to upload data onto the device 500. A computer program product, such as one utilizing a communication system may be tangibly embodied in storage medium 522, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 502 of FIG. 5). In yet other instances, a computing device may be a CPU, controller or processor combined with one or more additional hardware components. In certain example implementations, the computing device operating as a CPU, controller or processor may be operatively coupled with one or more peripheral devices, such as a navigation system. In another example implementation, the term computing device, as used herein, may refer to a satellite processor.

In accordance with an example implementation of the disclosed technology, the various available resources may be selected and utilized to affect and/or improve communications efficiency. For example, an effective bit-rate can be influenced by many factors including but not limited to noise, re-transmission of data due to errors, transmit power, error correction encoding/decoding, etc. Certain example implementations of the disclosed technology may provide a flexible, tunable optimization process to enhance the efficiency of the communication and control of the various resources.

Figure 6:
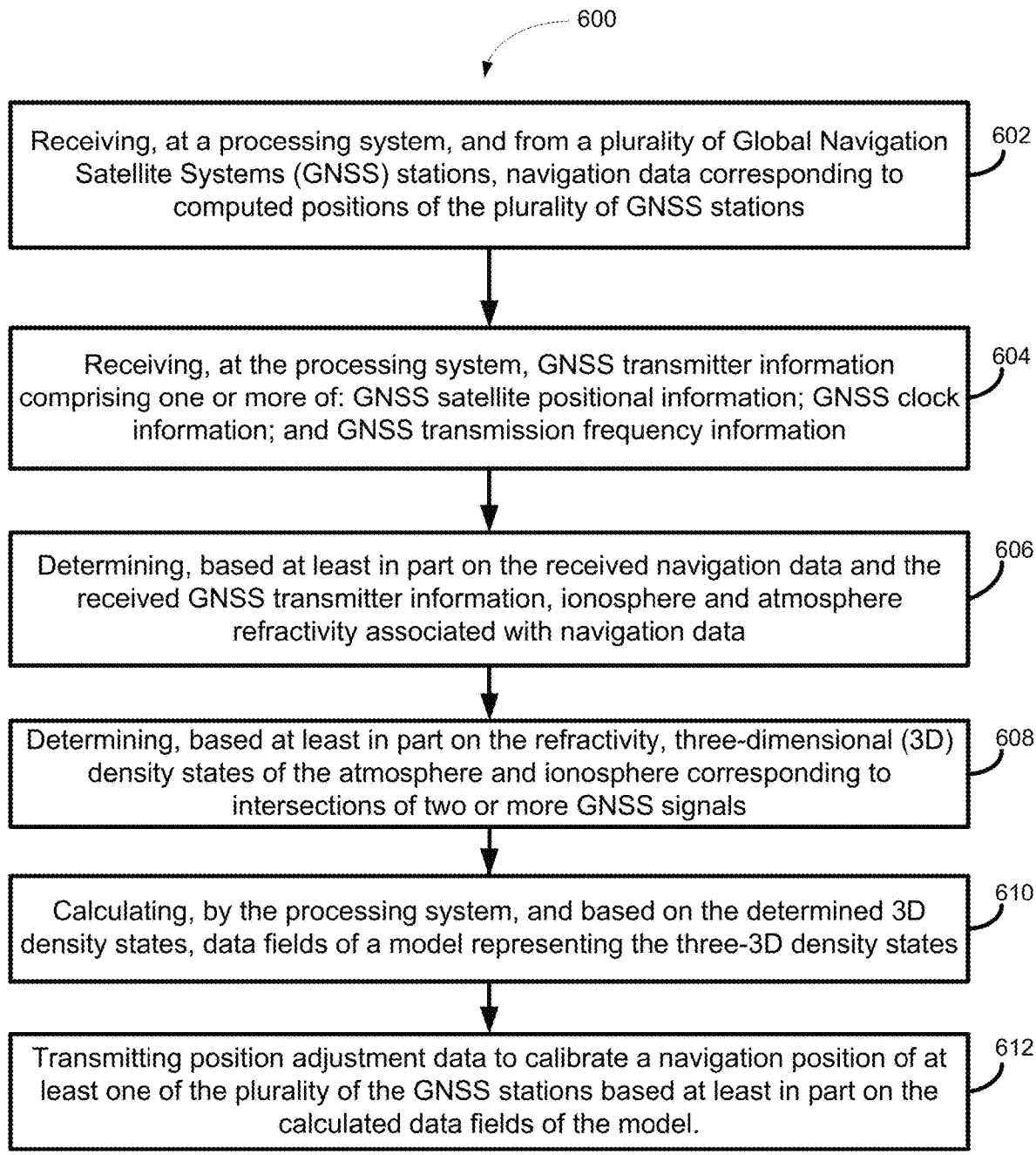
FIG. 6 is flow diagram of a method 600, according to an example implementation of the disclosed technology.

FIG. 6 is flow diagram of a method 600, according to an example implementation of the disclosed technology. In block 602, the method 600 includes receiving, at a processing system, and from a plurality of Global Navigation Satellite Systems (GNSS) stations, navigation data corresponding to computed positions of the plurality of GNSS stations. In block 604, the method 600 includes receiving, at the processing system, GNSS transmitter information including one or more of: GNSS satellite positional information; GNSS clock information; and GNSS transmission frequency information. In block 606, the method 600 includes determining, based at least in part on the received navigation data and the received GNSS transmitter information, ionosphere and atmosphere refractivity associated with navigation data. In block 608, the method 600 includes determining, based at least in part on the refractivity, three-dimensional (3D) density states of the atmosphere and ionosphere corresponding to intersections of two or more GNSS signals. In block 610, the method 600 includes calculating, by the processing system, and based on the determined 3D density states, data fields of a model representing the three-3D density states. In block 612, the method 600 includes transmitting position adjustment data to calibrate a navigation position of at least one of the plurality of the GNSS stations based at least in part on the calculated data fields of the model.

Figure 7:
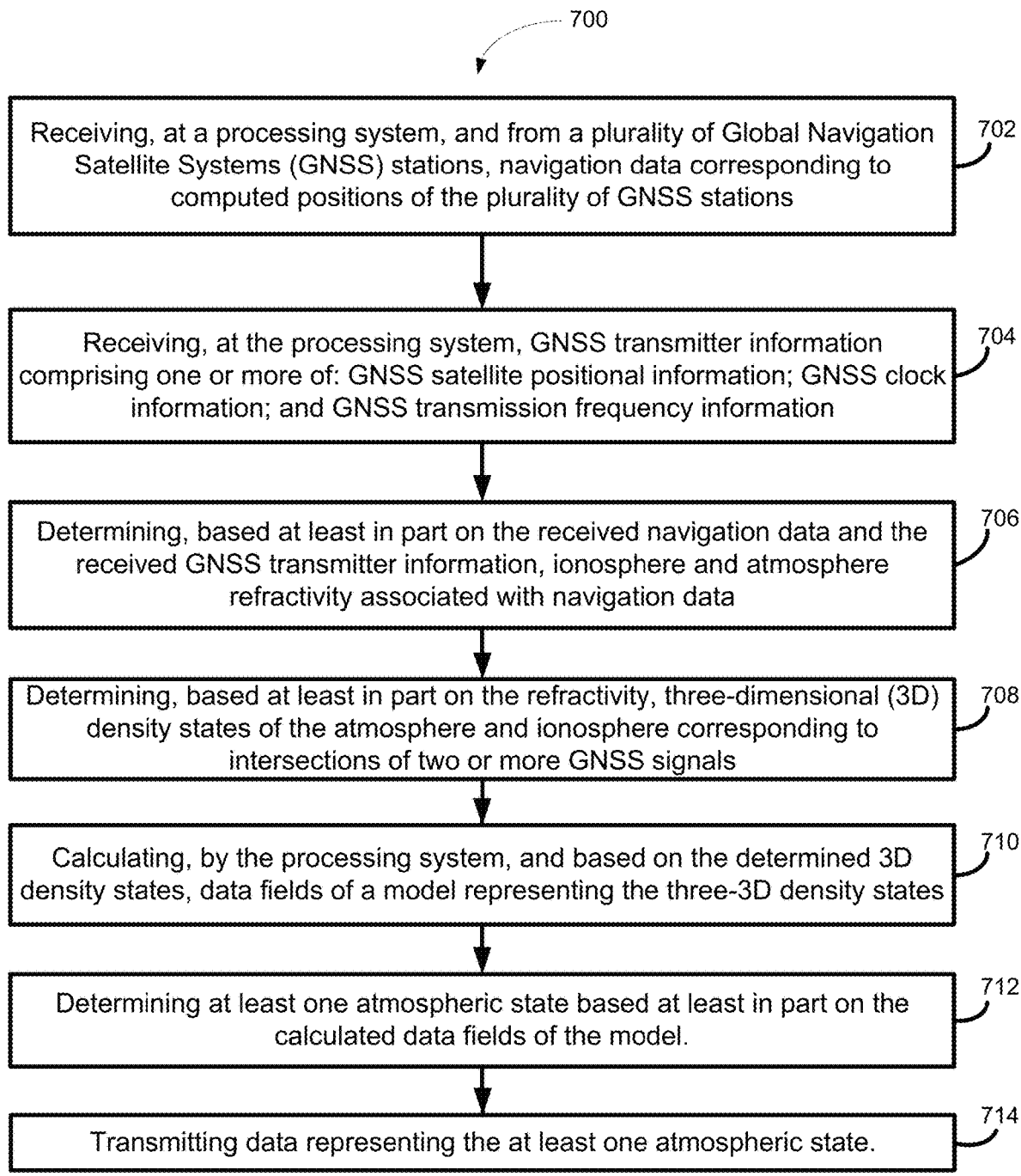
FIG. 7 is flow diagram of another method 700, according to an example implementation of the disclosed technology.

FIG. 7 is flow diagram of a method 700, according to an example implementation of the disclosed technology. In block 702, the method 700 includes receiving, at a processing system, and from a plurality of Global Navigation Satellite Systems (GNSS) stations, navigation data corresponding to computed positions of the plurality of GNSS stations. In block 704, the method 700 includes receiving, at the processing system, GNSS transmitter information including one or more of: GNSS satellite positional information; GNSS clock information; and GNSS transmission frequency information. In block 706, the method 700 includes determining, based at least in part on the received navigation data and the received GNSS transmitter information, ionosphere and atmosphere refractivity associated with navigation data. In block 708, the method 700 includes determining, based at least in part on the refractivity, three-dimensional (3D) density states of the atmosphere and ionosphere corresponding to intersections of two or more GNSS signals. In block 710, the method 700 includes calculating, by the processing system, and based on the determined 3D density states, data fields of a model representing the three-3D density states. In block 712, the method 700 includes determining at least one atmospheric state based at least in part on the calculated data fields of the model. In block 714, the method 700 includes transmitting data representing the at least one atmospheric state.

The method 600 and/or the method 700 may include additional steps or elements as discussed below.

In certain example implementations, determining the ionosphere and atmosphere refractivity can include computing density delay components for dry air, water, and ions.

In certain example implementations, variational assimilation may be utilized to compute the density delay components.

In certain example implementations, at least a portion of the plurality of GNSS stations can include one or more local processors, and the computed positions may be determined by the corresponding local processors.

According to an example implementation of the disclosed technology, the GNSS transmitter information may be received from a central command and control (CCC) system. In certain example implementations, the GNSS transmitter information may be received from one or more GNSS stations. In some example implementations, the GNSS transmitter information may be received from a service provider.

In certain example implementations, the navigation data and the GNSS transmitter information may correspond to two or more GNSS satellites.

According to an example implementation of the disclosed technology, determining the 3D density states include determining intersection angles of the two or more GNSS signals.

According to an example implementation of the disclosed technology, updating the model can include applying intersection angle weightings, such as trigonometric functions of the corresponding intersection angles.

In certain example implementations, determining the 3D density states can include determining dynamic changes associated with the atmosphere and ionosphere.

According to an example implementation of the disclosed technology, determining the 3D density states can include predicting future density states associated with the atmosphere and ionosphere.

According to an example implementation of the disclosed technology, the data fields of the model may be refined by feedback.

In certain example implementations, determining the ionosphere and atmosphere refractivity can include numerically solving the three-dimensional state using the mathematical technique of minimization. For example, an optimal three-dimensional density may be derived by minimizing a least square difference between the integrated refraction effects of density over one-dimensional rays to find the three-dimensional structure that is optimal.

In certain example implementations, three-dimensional density fields may be recovered using refractive effects detected in a large number of receivers. In certain example implementations, a sufficient number of rays from the GNSS satellites to the receivers may be accounted for to resolve the field(s). In certain example implementations, the rays may have significant numbers crossing at substantially different angles. In other words, in certain example implementations, the rays may not traverse a single predominant direction or path.

In accordance with an example implementation of the disclosed technology, Radio Occultation data may be communicated to a central processor and combined with the other in-situ data (such as from ships, aircraft and land surface receivers) to provide field resolution using the additional ray paths.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s) of the disclosed technology so described may include a feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a sequence, either temporally, spatially, in ranking, or in any other manner.

While certain implementations of the disclosed technology have been described regarding what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Material from "Diagnosis of Three-Dimensional Water Vapor Using a GPS Network," by MacDonald et al., Monthly Weather Review, Vol. 130, pp. 386-397, 2002

In recent years techniques have been developed to obtain integrated water vapor along slant paths between ground-based Global Positioning System (GPS) receivers and the GPS satellites. Results are presented of an observing system simulation (OSS) to determine whether three-dimensional water vapor fields could be recovered from a high-resolution network (e.g., with 40-km spacing) of GPS receivers, in combination with surface moisture observations and a limited number of moisture soundings. The paper describes a three-dimensional variational analysis (3DVAR) that recovers the moisture field from the slant integrated water vapor and other observations. Comparisons between "nature" moisture fields taken from mesoscale models and fields recovered using 3DVAR are presented. It is concluded that a high-resolution network of GPS receivers may allow diagnosis of three-dimensional water vapor, with applications for both positioning and mesoscale weather prediction.

1. Introduction

It has been shown that vertically integrated water vapor can be determined from the constellation of GPS satellites by isolating the effects of signal delay due to atmospheric water vapor (Bevis et al. 1992). Recently, techniques have been developed to determine the amount of phase delay between surface receivers and each of a number of the satellites that are in view (Alber et al. 2000; Braun et al. 2001, hereafter BRW). With a good estimate of the three-dimensional mass of the atmosphere, the amount of water vapor along the slant path can be estimated from the phase delay. These techniques, referred to as "slant" water vapor measurements, can significantly increase the information available about water vapor. Experiments presented here address whether three-dimensional variational analysis can recover a three-dimensional water vapor field using many integrated slant water vapor measurements from each of numerous stations in a horizontal grid. The technique requires an accurate lower boundary condition, such as the surface moisture measured by the network and other surface stations. The addition of a few moisture soundings per hour improve the convergence and accuracy of the three-dimensional field.

Water vapor is very important to short-range weather prediction (Emanuel et al. 1995). Precipitation and severe weather are closely related to the three-dimensional distribution of water vapor, yet skill in these predictions has been slow to improve. This is mainly due to the high spatial variability of water substance, as can be seen daily in satellite and radar images. As computer speeds increase, the ability of mescoscale prediction models to use high-resolution information will increase. Thus there is reason to hope that much better observations of three-dimensional water vapor would result in significant improvements in weather prediction.

In recent years there has been extensive study of the role that GPS water vapor measurements could play in weather prediction. The assimilation of precipitable water into a mesoscale model was first shown by Kuo et al. (1993). Later studies addressed variational assimilation of precipitable water into nonhydrostatic models (Kuo et al. 1996; Guo et al. 2000). These concepts are being tested with data from low-resolution networks (Wolfe and Gutman 2000; Ware et al. 2000). The concept of this study differs from earlier studies by assuming that the large amount of additional information obtained by use of slant water vapor delays could be used in a mesoscale (e.g., 40-km) resolution network to directly diagnose three-dimensional water vapor structure. The variation of water vapor in the vertical direction, made possible by the use of the slant measurements, is very valuable in both numerical and human weather prediction.

The main thrust here is to present the results of a test that addresses how well a high-resolution network of GPS receivers would recover three-dimensional water vapor fields. The test consists of the creation of a "nature" field of water vapor and the use of hypothetical observations from the nature atmosphere, including estimates of observational errors. The hypothetical observations of surface moisture and many measurements of slant water vapor are used as input to the three-dimensional variational (3DVAR) analysis. The resulting field is then compared with the nature atmosphere. We refer to this as an observing system simulation (OSS). A further step in determining the role of an observing system on a predictive model is generally referred to as an observing system simulation experiment or OSSE. We show the results of two observing system simulations, but do not address prediction differences (OSSEs), which may be the subject of future studies.

In the next section, we discuss the measurement of slant water vapor using GPS techniques. In section 3 we hypothesize a network design that could be used to recover three-dimensional water vapor fields and describe an OSS to test the concept. In section 4 we present the 3DVAR that is used in the OSS, and in section 5 we present the simulation results.

2. GPS Sensing of Slant Water Vapor

There are several approaches to GPS sensing of atmospheric water vapor from the ground. Bevis et al. (1992) used standard space geodetic techniques (e.g., Segall and Davis 1997) to estimate the 2-3-m zenith phase delay induced in GPS signals by the neutral atmosphere. Residual signal delays to each satellite can be mapped as a function of the cosecant of the satellite elevation angle (Niell 1996; Rocken et al. 2001), based on the assumption that the atmosphere is azimuthally homogeneous. This gives an average zenith delay from which the hydrostatic, or "dry" component estimated from surface pressure is subtracted. Precipitable water vapor (PW) is calculated as the product of the zenith delay and a conversion factor (Bevis et al. 1994). The accuracy of GPS-sensed PW by this method is better than 2 mm (e.g., Rocken et al. 1993; Fang et al. 1998).

The assumption of azimuthal symmetry (Davis et al. 1993; Elosegui et al. 1999) limits the accuracy and spatial resolution of GPS-sensed PW. Higher spatial resolution can be obtained by solving for the integrated water vapor or slant water (SW) along each GPS ray path. The SW is obtained by solving for the total slant delay along each ray path, and then subtracting the dry component of the slant delay. The dry slant delay can be estimated from three-dimensional numerical weather models (Chen and Herring 1997) by integrating dry air mass along the path. Alternatively, total slant delays could be assimilated directly into meteorological models, allowing the model to partition the wet and dry components.

The formula for calculating signal delay between a surface station and a satellite on a slant path is given by Kaplan (1996):

$$\text{slant delay} = C_1 \overbrace{\int_{surface}^{satellite} \rho_a ds}^{\text{dry delay}} + C_2 \overbrace{\int_{surface}^{satellite} \rho_{wv} ds + C_3 \int_{surface}^{satellite} \frac{\rho_{wv}}{T} ds}^{\text{moist delay}},$$

where ds is along slant path
$\rho_a$=atmospheric density,
$\rho_v$=water vapor density,
T=atmospheric temperature,
and $C_1$, $C_2$, and $C_3$ are constants.

In this formula it is assumed that the ionospheric delay has been removed. It can be seen that the "dry delay" is due to the presence of atmospheric mass between the receiver and the satellite, and the moist delay arises from two effects: the first term is the effect of water vapor mass, and the second is induced by the dipole moment of the water molecule.

3. Design a. Hypothetical Network Design

Our goal is to recover high-resolution (mesobeta) three-dimensional water vapor from a network of ground-based GPS receivers. To resolve this scale, the network must have a spacing comparable to the desired resolution. A grid of stations over the United States (excluding Alaska) at 40-km spacing would include about 5000 installations, while a grid of 60-km spacing would require a little more than 2000 installations. It is clear that there is a trade-off to be made between the number of the stations in the surface network and the cost of the system.

The operational concept includes a typical ground installation with a dual-frequency GPS receiver and an automated surface weather station measuring winds, temperature, and humidity. The number of GPS satellites in view from the surface would average about eight. We assume that with suitable time integration and averaging, there is one observed slant range between each station and each satellite every 5 min. Thus, for each station, there are approximately 100 observations of slant range moisture per hour. The observations are distributed around the hemisphere, with the exception of the northern quadrant, as discussed in Rocken et al. (1997). The geometry of the system allows more observations in the 45° closest to the zenith than in the 45° above the horizon, but there are typically several satellites rising or setting during the 1-h period. We refer to the "splay" of slant ranges as the dataset taken during an observing period, which in our case is taken to be 1 h. In addition to the integrated slant water vapor measurements, there are two other types of observations used in the 3DVAR. The inclusion of an accurate moisture sensor at each station allows the integrals of slant water vapor to start from the surface with a known value, which is a very valuable constraint in the variational analysis. In addition, a low density of water vapor soundings (e.g., from microwave radiometers, Solheim et al. 1998) is needed to constrain the analysis.

An important characteristic of the network would be to resolve moisture in the lowest layers of the atmosphere. It is an observational fact that moisture is generally greatest near the surface, and typically decreases upward with a scale height of about 2500 m. The boundary layer, which is normally 1000-3000-m deep, is very important in weather prediction. For example, showers and thunderstorms are usually driven by moisture-laden plumes originating in the boundary layer (Emanuel et al. 1995). The use of the low angles allows resolution of the moisture to within approximately 250 m above the surface, with resolution of 500 m above. The density of stations and the lowest usable slant angle both determine the minimum altitude that the GPS network would be sampling. At lower slant ranges, say, less than 6°, the measurement of slant range water vapor has some associated difficulties. Most important are blockage due to the terrain horizon, reduced signal strength, and multipath effects in which the signal is reflected from surface objects. Despite these difficulties, there is evidence that usable slant range water vapor can be obtained down to the horizon (Ware et al. 1997). A recent test that measured GPS bending angles from a surface receiver (Sokolovskiy et al. 2001; Lowry et al. 2001) showed that the GPS-measured refractivity agreed well with collocated radiosondes all the way to the surface.

b. Observing System Simulation

An OSS begins with the creation of a dataset with the goal of emulating nature. Ideally, if there were an experiment where moisture soundings were taken at 10-km spacing over a large domain (e.g., 1000 or more kilometers on a side), this dataset could be used to represent nature for a simulation. Unfortunately, such a dataset does not exist. Since we do not have such realistic field measurements, a technique must be used to create a nature field that is reasonable. By reasonable, we mean that the characteristics of the field, such as its power spectrum, spatial distribution, including typical gradients, etc., must be like those found in the real atmosphere. We assumed in this experiment that state-of-the-art high-resolution mesoscale models could create water vapor fields that are similar to those found in the real atmosphere.

In the OSS described here, we used two mesoscale models to create nature atmospheres over an approximately square domain with sides of 1460 km centered in the west-central United States. The domain was chosen to include the lower, flatter topography of the Great Plains on the east side and the complex terrain of the Rocky Mountains. This also meant a gradient of moisture, with high specific humidities in the eastern area, and in the west the low humidities characteristic of the mountains. The two models used were the quasi-nonhydrostatic (QNH) model of MacDonald et al. (2000) and the Pennsylvania State University-National Center for Atmospheric Research fifth generation Mesoscale Model (MM5; Dudhia 1993). Both models were run at 10-km resolution for 36 h, with the three-dimensional water vapor at the end of the period taken as the nature dataset. Each model has a full microphysics package, with at least five water forms (vapor, rain, snow, cloud water, and cloud ice) and the associated phase changes. Both models develop complex moisture fields in three dimensions, with high gradients in both the horizontal and vertical directions. As has been seen in aircraft measurements of water vapor fields (e.g., Palmen and Newton 1969), the spatial variance on mesobeta scales is quite large. The reasons for this variability are well known: they include nonlinear scale collapse, and the fact that when high gradients develop in water vapor fields, generally only diffusive processes operate to even them out. This characteristic is in contrast to the dynamic fields in which a high gradient (e.g., of temperature) causes strong adjustment processes that operate to decrease spatial variability. Another process that operates to generate complex moisture fields is the combination of phase change, such as condensation, and gravity. A dry lower atmosphere can be penetrated by a rain shaft, with the resulting evaporation generating strong moisture gradients. In the two cases used for nature runs, all of these processes operated to create complex and realistic-looking three-dimensional moisture fields.

The QNH model was initialized in April 1999, while the MM5 run was from a late January 1999 case. Thus the results are representative of a moist springtime moisture field and a drier, colder winter moisture field. Both models showed the results of small-scale precipitation processes, which had generated small areas of enhanced water vapor, an important test for the hypothetical system. As will be shown in section 5, the technique was able to recover this structure, albeit slightly smoothed.

The next step in the OSS is to use the nature field to generate pseudo-observations of the slant water vapor, the surface moisture fields, and the soundings. These pseudo-observations from the network are used as input to the variational analysis that attempts to approximate the nature field. A number of precautions were taken to make the data realistic. The pseudo-observations of water vapor were randomly perturbed by a 5% error function, which was based on estimates of random error by BRW. For lower angles, below 6°, the error was increased to 7%. Also, those slant paths that penetrated the lateral boundary were perturbed with 7% errors. Note that ground-based GPS stations do not measure integrated water vapor, but rather integrated delay, which includes effects due to atmospheric mass between the receiver and the satellite, and ionospheric delay, as discussed in section 2. The chosen error bounds include errors due to these effects, and thus makes it reasonable to analyze the system in terms of water vapor delays. It was not assumed that the stations could be located precisely on a grid; a busy highway would not be a good place to site a station. The station locations were perturbed in a ring around the nominal station grid points, with an average "location change radius" of 5 km. The surface moisture readings were assumed to have random errors of 5%, and the vertical soundings were given average moisture errors of 8% based on statistical comparison with radiosondes (Güeldner and Spänkuch 2001).

In order to collect enough pseudo-observations, there is an assumption of stationarity for the water vapor field. All observations for an hour are treated in the variational analysis as if they represent a single field. This implies that for the very small scale (e.g., less than 20 km), rapid changes in the moisture field will not be resolved. To make the OSS realistic, we used the actual ephemeris data to locate the satellites every 5 min. The significant motion of the satellites causes each measurement to be made in a different direction, making the measurements somewhat independent. Furthermore, the model moisture data were allowed to change through the hour by use of the actual 5 min data from the model run.

The OSS is properly defined if realistic errors for the observations are included. In particular, if a technique for recovery of slant water vapor is tested against another observing system and the average error of the water vapor is determined, then no other information is necessary for the simulation. Slant water vapor measurements using GPS have been validated by comparison with microwave radiometers to determine the errors used in this simulation (BRW). This does not imply that this approach would be used in an operational system. It is likely that additional information could be gleaned by using total delay in an operational variational analysis, which would provide temperature as well as moisture information. We have isolated the moisture in this simulation to simplify the exposition.

There are two techniques possible for recovery of water vapor. First, the 3DVAR could use total delay, and be formulated to recover both temperature and water vapor. This approach is currently being investigated by the authors. A second technique is to take the mass field as a given, with an assumed error. In the second technique, a future operational system for water vapor would use the latest and best analysis of the mass field available to calculate the dry delay. For example, the Rapid Update Cycle (RUC) model now has hourly analysis (Smith et al. 2001) of the mass field and could be used to isolate the dry delay due to mass from the unknown wet delay. This procedure would work well except in those cases where the delays are strongly correlated and not accommodated in the model analysis. For example, an area of heavy rain showers falling into a dry lower layer can result in cooling and moistening of the layer. Both the cooling and moistening result in an increased signal delay between the satellite and the receiver. Thus, an operational analysis system would be best if it used measurements such as hourly surface pressure changes, and estimates of evaporative cooling to refine the mass field before use in the moisture-based 3DVAR analysis. The separation of dry delay from moist delay constitutes a significant assumption in this analysis and will need to be further tested, both theoretically and experimentally.

With the pseudo-observations from the nature atmosphere, a 3DVAR is used to determine the three-dimensional distribution of water vapor. Here, we use a simple version of 3DVAR in which it is assumed that the errors in the pseudo-observations of slant range water vapor are randomly distributed and uncorrelated with one another. We do not use a model background. In a more realistic future analysis, background errors would also need to be considered. Theoretically, the assumption of random errors is not too bad (Kaplan 1996), and should not invalidate the main conclusions of the study.

Figure 8:
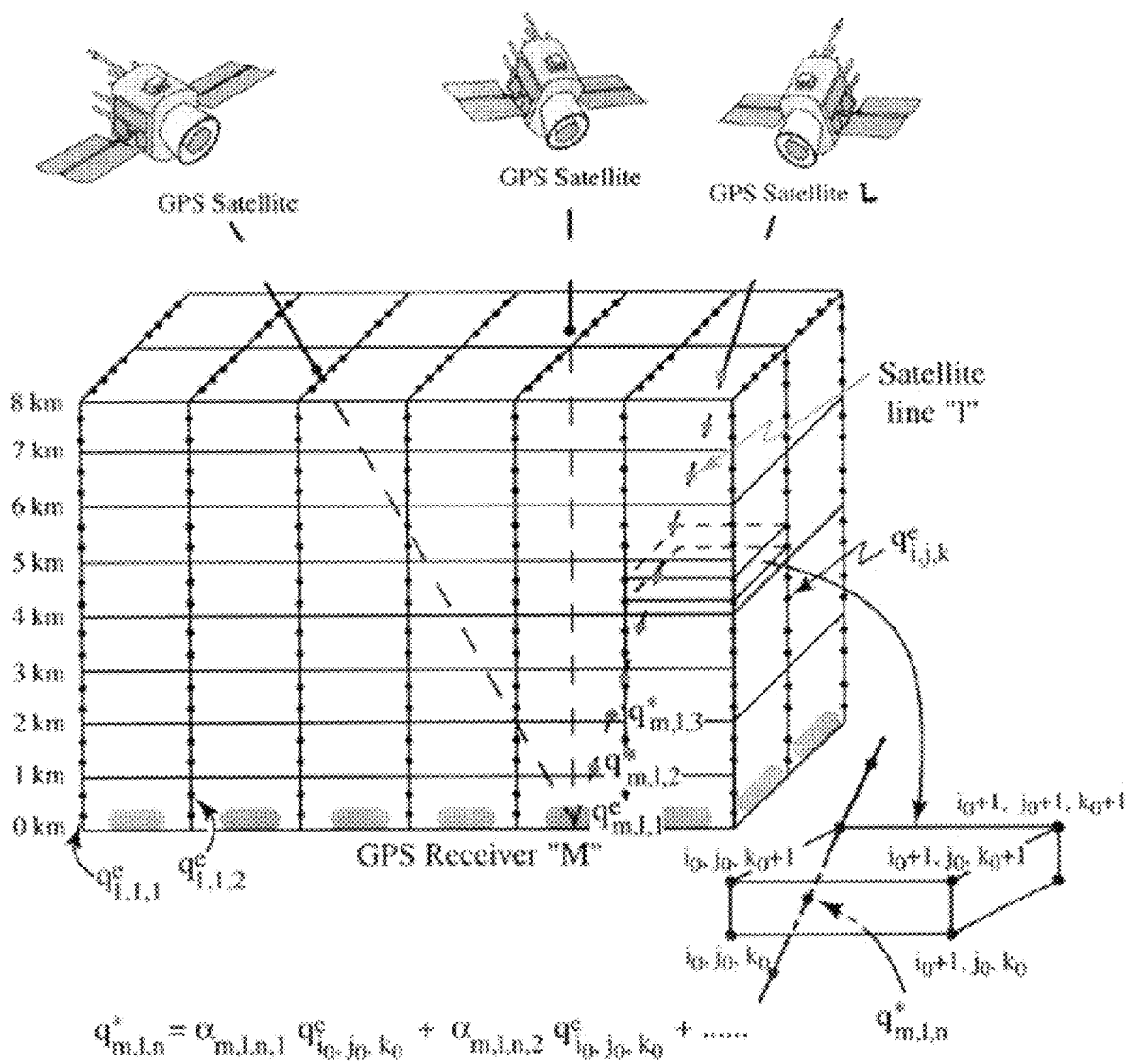
FIG. 8 is a schematic of the grid used for the 3DVAR analysis. Surface stations are represented by grey ovals at 0 km. The line between surface station M and satellite L is referred to as line m, l. Control grid points are identified by $q^e_{i,j,k}$. The forward model is the estimate of the line integral $q^*_{m,l}$ from the control grid $q^e$.

FIG. 8 is a schematic of the network and grid used for the 3DVAR analysis. The small ovals on the bottom are the symbols for the GPS receivers and associated surface humidity sensors. The regularly spaced dots on the grids are the locations of the control points. At each control point, the 3DVAR has a control variable, the estimated water vapor (specific humidity), that will be iterated through a series of estimates toward the best estimate field. Each GPS receiver has an associated splay of pseudo-observations of integrated slant water vapor, and an estimated slant water vapor from the control grid (e.g., the forward model) is obtained by interpolating and using a Riemann sum. The number of control points in the grid must be exceeded by the number of observations in order for the 3DVAR problem to be well determined. In the cases presented here, a 40-km resolution network and control grid can be well determined if there are approximately 100 observations per station, as discussed in section 3a.

The 3DVAR control grid is formulated with 40-km resolution in the horizontal and 500 m in the vertical. Our first attempt at an OSS 3DVAR used 40-km model data. This had very rapid convergence and excellent correspondence to the nature run. However, we thought that it was unrealistic to use such a low-resolution nature run, because it would not perturb that analysis with smaller scale variability. When we tried to run the 3DVAR analysis using 10-km model data, it was much more difficult to obtain convergence. As discussed in section 4, we needed to use a multigrid technique to get convergence when the high-resolution model data were used. We think that the 16-fold increase in model data points, which enters the problem through the pseudo-observations, realistically accommodates the variability that will be seen in the real atmosphere. It should be noted that although it was more difficult to obtain convergence with the high-resolution data, the improved techniques resulted in excellent convergence, as will be shown in section 6. However, it is possible that mesogamma-scale variability, associated with clouds, may cause difficulties. These could be tested with a higher resolution nature model.

4. Variational Formulation

In this section we present the mathematical formulation of the 3DVAR problem. The simulation starts with a set of observations of the GPS slant integrated water vapor and a first guess of the water vapor field. In general, if an integral of precipitable water along a slant path is calculated numerically from the first-guess grid, it will differ significantly from the actual observation for the slant water vapor. We call the grid of estimated water vapor specific humidity the control grid. The idea is to iterate the estimated grid values to minimize the difference between the actual observations and the estimates from the control grid. We start by computing an estimate for slant water vapor from the control grid.

a. GPS Line Integral

We compute an estimated integrated water vapor using the grid values along each GPS line, $c_{m,l}$, which starts from a ground station $G^m$ located at $(x^m, y^m)$ and points to a satellite $S^l$. Denote this quantity as $Q^e(x^m, y^m, l)$. That is, $$Q^e(m^x, y_m, l) = \partial_{c_{m,l}} q\, ds,$$

which can be approximated using the values of $q_{i,j,k}$, the specific humidity for a grid box. First the integral can be approximated by $$\int_{c_{m,l}} q\, ds = \sum_{n=1}^{N} q(c_{m,l,n})\Delta s,$$

where $c_{m,l,n}$ is a sequence of equally spaced points on the curve $c_{m,l}$ and $\Delta s$ is the length between two adjacent points. Therefore, we have the following approximation:

$$Q^e(x^m, y^m, l) \simeq \tilde{Q}^e(x^m, y^m, l)$$
$$= \Delta s \sum_{n=1}^{N} (\alpha_{1,1,1}^{m,l,n} q_{i_0(n),j_0(n),k_0(n)} + \alpha_{2,1,1}^{m,l,n} q_{i_0(n)+1,j_0(n),k_0(n)} +$$
$$\alpha_{1,2,1}^{m,l,n} q_{i_0(n),j_0(n)+1,k_0(n)} + \alpha_{2,2,1}^{m,l,n} q_{i_0(n)+1,j_0(n)+1,k_0(n)} +$$
$$\alpha_{1,1,2}^{m,l,n} q_{i_0(n),j_0(n),k_0(n)+1} + \alpha_{2,1,2}^{m,l,n} q_{i_0(n)+1,j_0(n),k_0(n)+1} +$$
$$\alpha_{1,2,2}^{m,l,n} q_{i_0(n),j_0(n)+1,k_0(n)+1} + \alpha_{2,2,2}^{m,l,n} q_{i_0(n)+1,j_0(n)+1,k_0(n)+1}),$$

where the $\alpha$s are the bilinear interpolation coefficients and $[i_0(n), j_0(n), k_0(n)]$ are the lowest indices of a grid cell containing the point $c_{m,l,n}$.

b. The Cost Function and its Gradient

The cost function is used to represent the difference between the slant water vapor observations and the approximations of slant water vapor calculated from the control grid. The cost function is defined as $$f = \frac{1}{2} \sum_{m=1}^{M} \sum_{l=1}^{L_m} [\tilde{Q}^e(x^m, y^m, l) - Q^o(x^m, y^m, l)]^2.$$

This typical optimization problem can be solved by numerical optimization algorithms. The technique we have chosen requires the gradient of the cost function.

c. Optimization Technique

To minimize the cost function, a fairly large-scale minimization problem, the limited memory BFGS (L-BFGS) method (Liu and Nocedal 1989), is used. The BFGS method is a quasi-Newton method which has faster convergence rate than the steepest descent algorithms. Suppose at the nth iteration, we have an approximation $G^n$ of the solution $G^*$, where G is a vector with elements of $q_{i,j,k}$, and an approximation of the Hessian off at $G^n$, $B^n \cong \nabla^2 f$. The BFGS method obtains new approximations by $$G^{n+1} = G^n - (B^n)^{-1} \nabla f(G^n), \text{ and}$$
$$B^{n+1} = B^n - \frac{B^n s_n s_n^T B^{nT}}{s_n^T B^n s_n} + \frac{Y_n Y_n^T}{s_n^T Y_n},$$

where $$s_n = G^{n+1} - G^n, \text{ and } Y_n = \nabla f(G^{n+1}) - \nabla f(G^n).$$

To further restrict the solution, we solve this minimization problem with a simple bound, $q_{i,j,k} \geq 0$. In the numerical tests, we use the L-BFGSB algorithm developed by Byrd et al. (1995).

The 3DVAR analysis is initialized with a first guess. This was constructed by taking the surface values of the water vapor specific humidity and assuming an exponential drop-off with altitude, with an e-fold radius in the vertical of 2500 m. With an initial guess, the L-BFGSB algorithm starts iterating until a certain termination criterion is met.

d. Multigrid Technique

We were able to solve the 3DVAR problem with the above formulation and algorithm. However, to counter a very noisy moisture field, we had to smooth the field in order to see the large-scale features. A very slow reduction of the cost function after the initial 10-20 iterations convinced us that the optimization algorithm spent most of the iterations converging the small-scale features and improved the long waves very little. This suggested that a multigrid technique could be helpful in improving the convergence of the longer waves. Thus, we combined the multigrid technique and the L-BFGSB algorithm in our numerical experiments. The multigrid technique is implemented with two multigrid levels, 40- and 80-km grids, over the same domain. We ran 10 iterations of the L-BFGSB algorithm to reduce the cost function over the 40-km grid and then projected the solution of the 40-km grid to the 80-km grid. On the 80-km grid, we ran 20 iterations of the L-BFGSB algorithm to reduce the new cost function over the 80-km grid and obtained an approximate solution. Then we interpolated the solution to the 40-km grid and ran 10 iterations of L-BFGSB algorithm again. This procedure, one multigrid cycle, can be repeated. We repeated this cycle 10 times. As a result, the solutions showed good convergence in the long waves without any smoothing. The multigrid and the uniqueness of the solution are discussed in MacDonald and Xie (2000).

5. Results

We present two types of results. First, we present depictions of the nature fields, and the fields recovered from the variational analysis for comparison. Second, we show several quantitative comparisons of the improvement in the analysis that could result from the proposed network.

a. Depiction of the Nature and 3DVAR Fields

Several depictions of fields were obtained from the 3DVAR analysis for comparison with the nature fields. For the horizontal depictions, we display the specific humidity. In this OSS, we used 16 moisture soundings distributed evenly over the domain, a surface moisture observation from each station in the 40-km network, and the integrated slant water vapor observations.

Figure 9A:
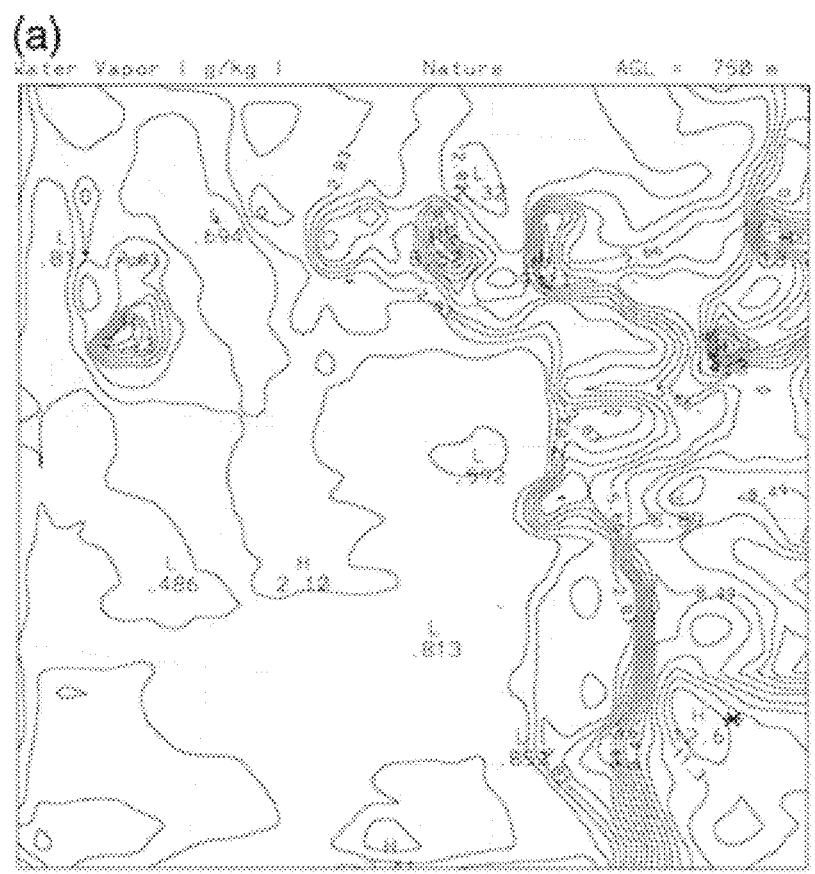
FIG. 9A shows a horizontal plot of specific humidity in g kg$^{-1}$ for the nature run. The nature run is from an April run of the QNH model. Notice the "dryline" along the west side of the Texas Panhandle into Kansas. It is clearly evident in the 3DVAR, albeit somewhat smoother. The location of the skew-Tcomparison in FIG. 12 is marked by an asterisk in the lower right corner.
Figure 9B:
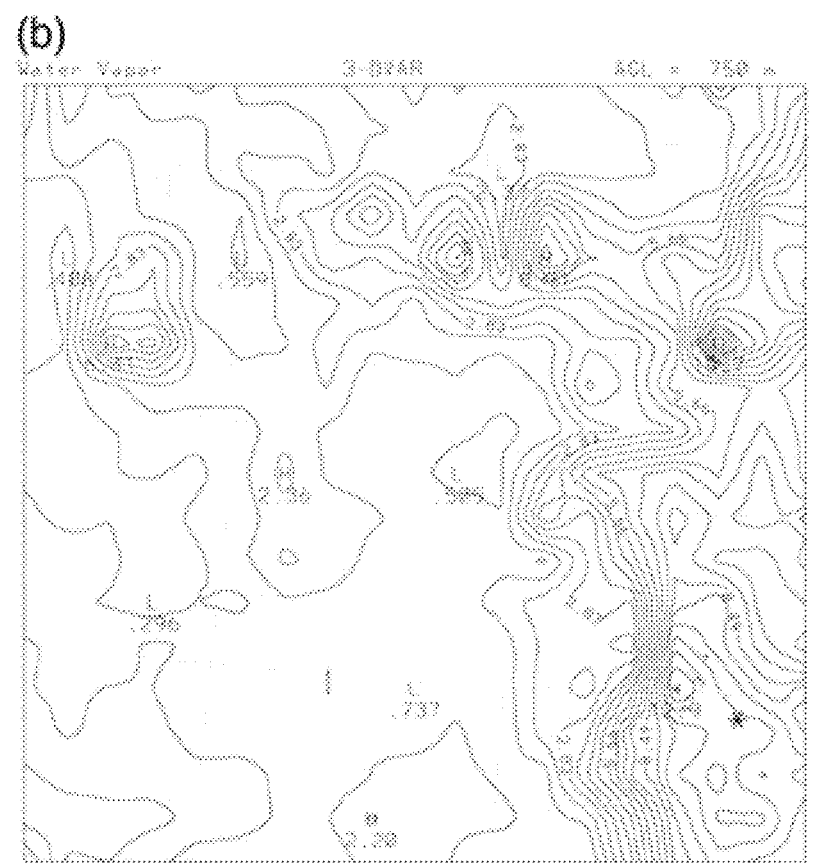
FIG. 9B shows horizontal plots of specific humidity in g kg$^{-1}$ for the 3DVAR analysis at the 750-m level.

FIG. 9A and FIG. 9B shows a horizontal plot of specific humidity (g kg$^{-1}$) at the 750-m above ground level (AGL) for the test area of the western United States. Note that the area goes from central Montana in the north to southern New Mexico in the south, and from central Utah to central Kansas in the east-west direction. FIG. 9A is the nature run, and FIG. 9B is the field recovered from the 3DVAR analysis. Starting with the nature run, a number of features are evident. A strong gradient of water vapor, the "dryline," is evident from the Texas Panhandle up through central Kansas. An area of higher moisture values, with a maximum of 12.6 g kg$^{-1}$, is located just to the east of the dryline on the Oklahoma-Kansas border. Comparing the nature run with the 3DVAR, it is seen that the dryline has been recovered in the right place, with a decrease in the horizontal gradient. This is what would be expected from a 40-km grid spacing, where the nature field is created at 10-km resolution. Notice that the 3DVAR analysis recovered a moisture value of 12.9 g kg$^{-1}$ on the Oklahoma-Kansas border moisture maximum. A large portion of the southwestern part of the domain has rather low values of specific humidity. Compare the minimum of moisture of 0.592 g kg$^{-1}$ near the Colorado-Wyoming-Nebraska triple point with the 3DVAR minimum of 0.505 g kg$^{-1}$ slightly to the south. Similarly, compare the value of the maximum in western Colorado of 2.10 g kg$^{-1}$ in the nature run with the 2.19 g kg$^{-1}$ located slightly to the north in the 3DVAR analysis.

Across the northern portion of the nature run are a series of small-scale maxima of moisture due to precipitation, which had fallen earlier. For example, note the maximum of 14.3 g kg$^{-1}$ near the Nebraska-South Dakota border, two maxima on either side of the Wyoming-South Dakota border, and the maxima near the Wyoming-Idaho-Utah triple point. These should be compared with the same maxima in the 3DVAR analysis. Again, it is seen that the gradients are somewhat smoothed and the values are typically within 10%-20% of the nature run. In summary, at the 750-m level, typically in the middle of the boundary layer, the moisture analysis is far superior to that which could be obtained from the current network of radiosondes. Furthermore, this type of analysis would be available hourly, in contrast to the radiosondes, which only go up twice a day.

FIG. 10A, FIG. 10B, and FIG. 10C shows a horizontal plot of specific humidity at 3250 m AGL for the nature run, 3DVAR, and a Barnes (1981) analysis. The Barnes analysis is presented to show the moisture diagnosis available from the current observing system. The black dots mark the location of radiosonde sites that were used in the analysis. A striking difference between the Barnes analysis (FIG. 10C) and the nature and 3DVAR analyses is its smoothness. The Barnes analysis only captures the synoptic-scale moisture variability. This is a reflection of the fact that the current upper-air observing system undersamples the moisture field (Emanuel et al. 1995). Again, similar to the discussion of the 750-m level, it can be seen from FIG. 10A and FIG. 10B that the 3DVAR captures the small-scale mesobeta moisture fields with reasonable accuracy.

Figure 11A:
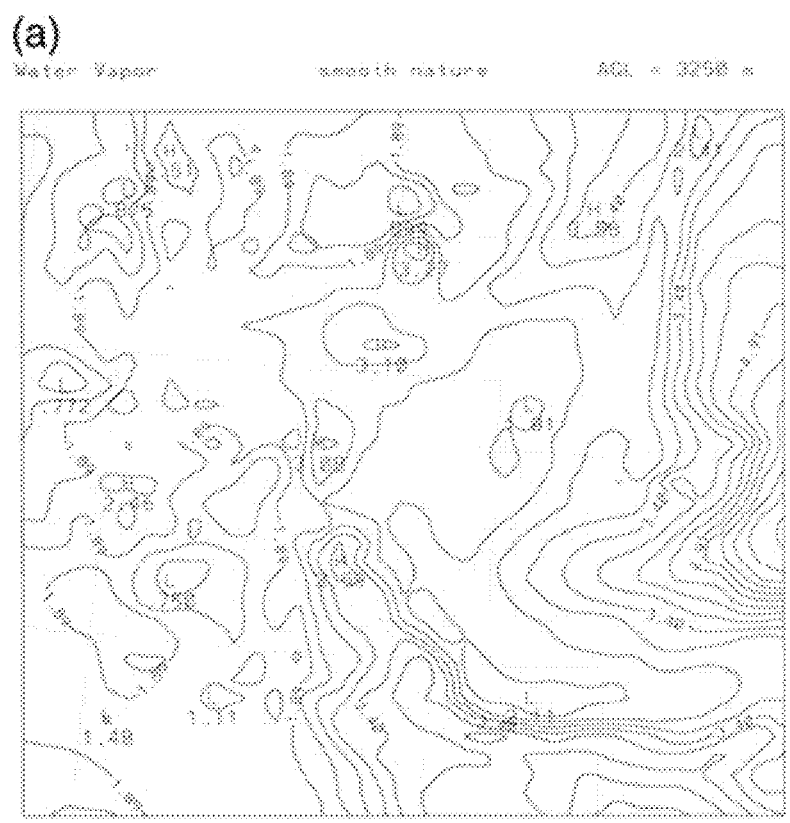
FIG. 11A shows a horizontal plot of specific humidity (g kg$^{-1}$) at the 3250-m level for the nature run.
Figure 11B:
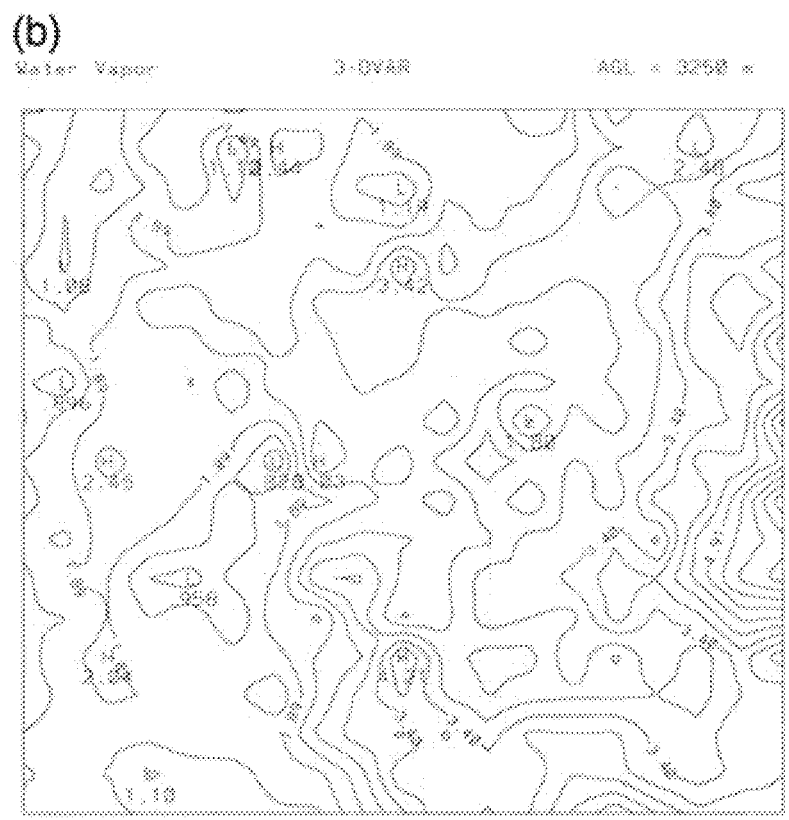
FIG. 11B shows a horizontal plot of specific humidity (g kg$^{-1}$) at the 3250-m level for the 3DVAR case for the January MM5 case.

FIG. 11A and FIG. 11B shows plots of specific humidity at the 3250-m-level from the January MM5 case. The nature run, FIG. 11A, shows higher moisture values along the eastern border and a lobe of moisture from the Texas Panhandle into southern Colorado. These features are in the 3DVAR, FIG. 11B, but are not as well defined. The small features over the mountains have corresponding features in the 3DVAR analysis. In general, the 3DVAR does not do as well for drier parts of the atmosphere because it is minimizing on the rms of the field—an rms of 0.5 g kg$^{-1}$ is a bigger percentage error when the field value is 1 g kg$^{-1}$ than it is when the field is 10 g kg$^{-1}$.

Figure 12:
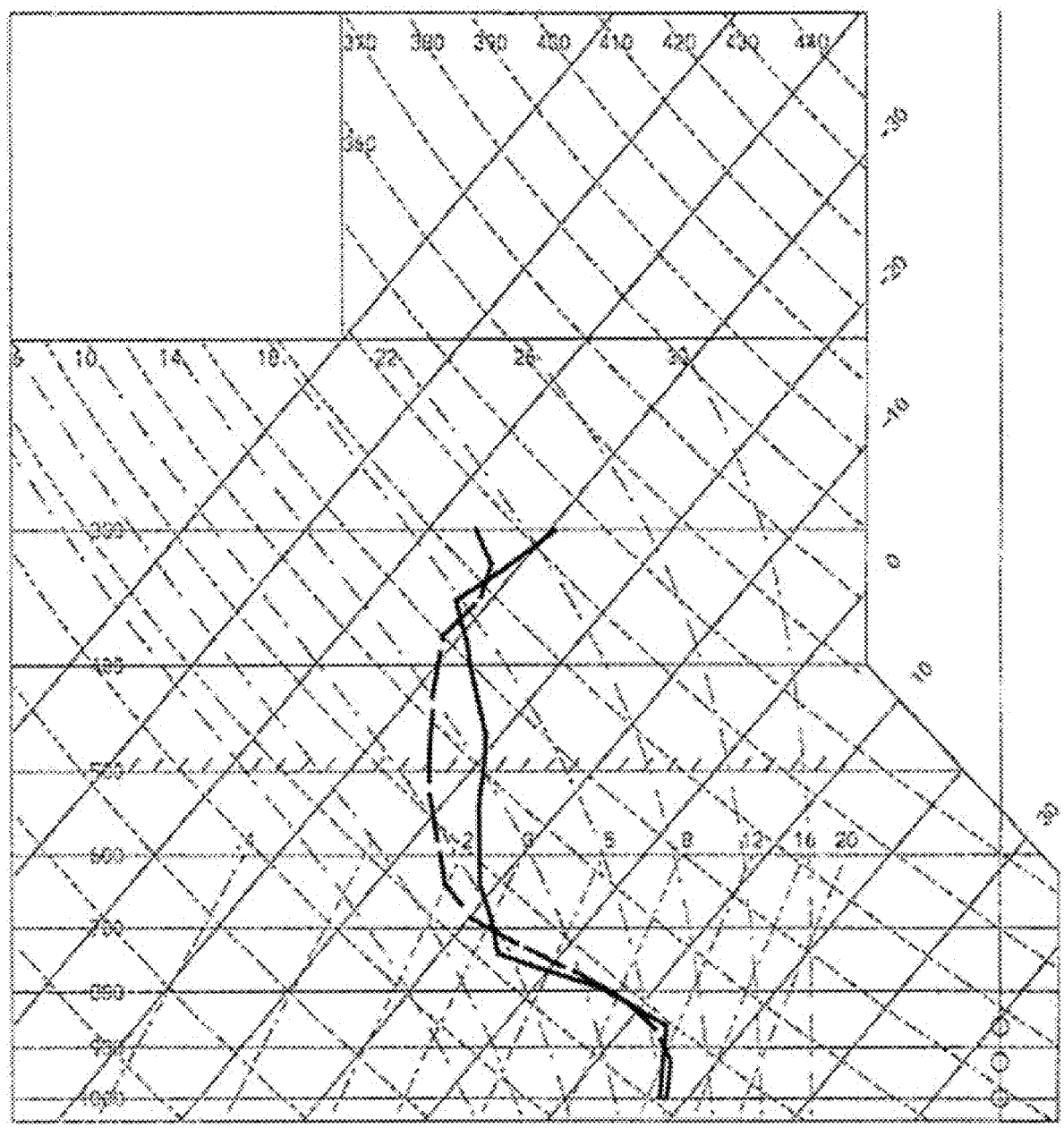
FIG. 12 shows a skew T-log P diagram comparing the moisture soundings. The solid line is from the nature run and the dashed line is from the 3DVAR analysis. This sounding, from the April QNH test, shows that the slant water vapor analysis is able to recover the strong gradient of moisture between 850 and 750 mb seen in the nature run.

A skew T-log P moisture sounding for the April QNH case is presented in FIG. 12. There are two curves: the solid curve from the nature run and the dashed curve from the 3DVAR. The location of the sounding, picked to be in a moist area, is marked with an asterisk in FIG. 9A and FIG. 9B. The 3DVAR captures the moist layer from the surface to 850 mb and the transition from moist to dry between 850 and 750 mb. The 3DVAR is drier in the layer from 700-400 mb. The lower accuracy seen in the upper troposphere is discussed in the next section. This sounding is an excellent example of the rationale for using the slant water vapor observations. The strong vertical gradient of moisture between 850 and 750 mb is very important, and could never be gleaned from the use of vertically integrated water vapor measurements.

b. Quantitative Comparison

The OSS approach allows comparison of different analysis techniques against the "truth," that is, the nature field. In this study, the 3DVAR analysis derived from the hypothetical 40-km-spaced network of GPS slant water vapor, surface stations, and a few vertical soundings can be compared with the Barnes analysis that would be obtained from the existing radiosonde network. Note that the radiosonde locations are shown in FIG. 3c.

We calculated three quantities: the percent error (pce), the rms error, and the bias. These quantities are defined as $$E_{pce} = \sqrt{\frac{\sum_{i=1,j=1,k=1}^{N_x,N_y,N_z} (q_{i,j,k}^{Est} - q_{i,j,k}^{Tru})^2}{\sum_{i=1,j=1,k=1}^{N_x,N_y,N_z} (q_{i,j,k}^{Tru})^2}},$$

$$E_{rms} = \sqrt{\frac{\sum_{i=1,j=1,k=1}^{N_x,N_y,N_z} (q_{i,j,k}^{Est} - q_{i,j,k}^{Tru})^2}{N_x N_y N_z}}, \text{ and}$$

$$E_{bias}(k) = \frac{\sum_{i=1,j=1}^{N_x,N_y} (q_{i,j,k}^{Est} - q_{i,j,k}^{Tru})^2}{\sum_{i=1,j=1}^{N_x,N_y} (q_{i,j,k}^{Tru})}.$$

Table 1 shows the rms error of the two simulations. In both cases, the rms error of the 3DVAR slant water vapor network is smaller by a factor of 2 than the Barnes analysis of the radiosonde network. This substantial reduction should make a difference in model predictions and analysis of fields such as the lifted index. Similarly, the pce, shown in Table 2, indicates that the 3DVAR approach is better by a factor of two in both simulations.

Figure 13:
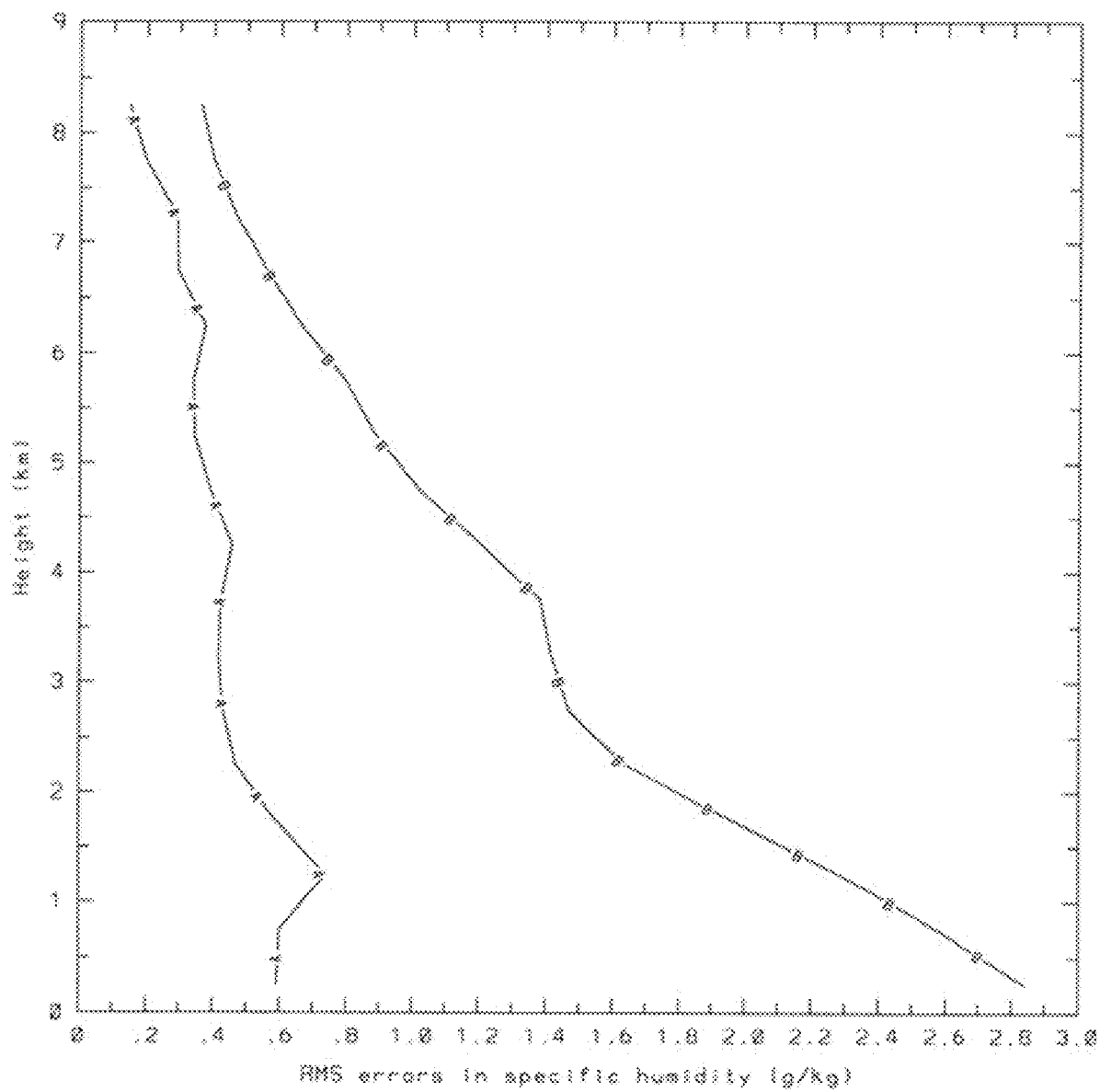
FIG. 13 shows a vertical plot of the rms error of specific humidity (g kg$^{-1}$) against the nature run from the QNH April case using the 3DVAR (A curve) and the Barnes scheme (B curve).

We also studied the rms and bias as a function of height above ground. FIG. 13 shows the rms for the April case. It can be seen that the rms of the Barnes analysis of radiosondes starts out quite large, about 2.8 g kg$^{-1}$ near the surface, and decreases with height up to 8 km. The general decrease is because the lower atmosphere is far more moist, with a typical scale height for moisture of between 2 and 3 km. The 3DVAR has an error of about 0.6 g kg$^{-1}$ near the surface, with similar values all the way to 8 km. Note that the goal of the 3DVAR algorithm is to equalize rms errors over the whole domain. It is clear from FIG. 13 that it was quite successful in this case, converging to a similar error regardless of altitude. As a result, the 3DVAR slant water vapor network analysis is far superior in the lower levels, but actually inferior at levels above 6.5 km. This suggests that if the moisture of the upper troposphere were more important than that of the lower troposphere, the 3DVAR could be weighted to do a better job at higher altitudes. In fact, the low- and midtropospheric moisture analysis is more important for weather prediction simply because the amount is so much larger in the lower levels.

Figure 14:
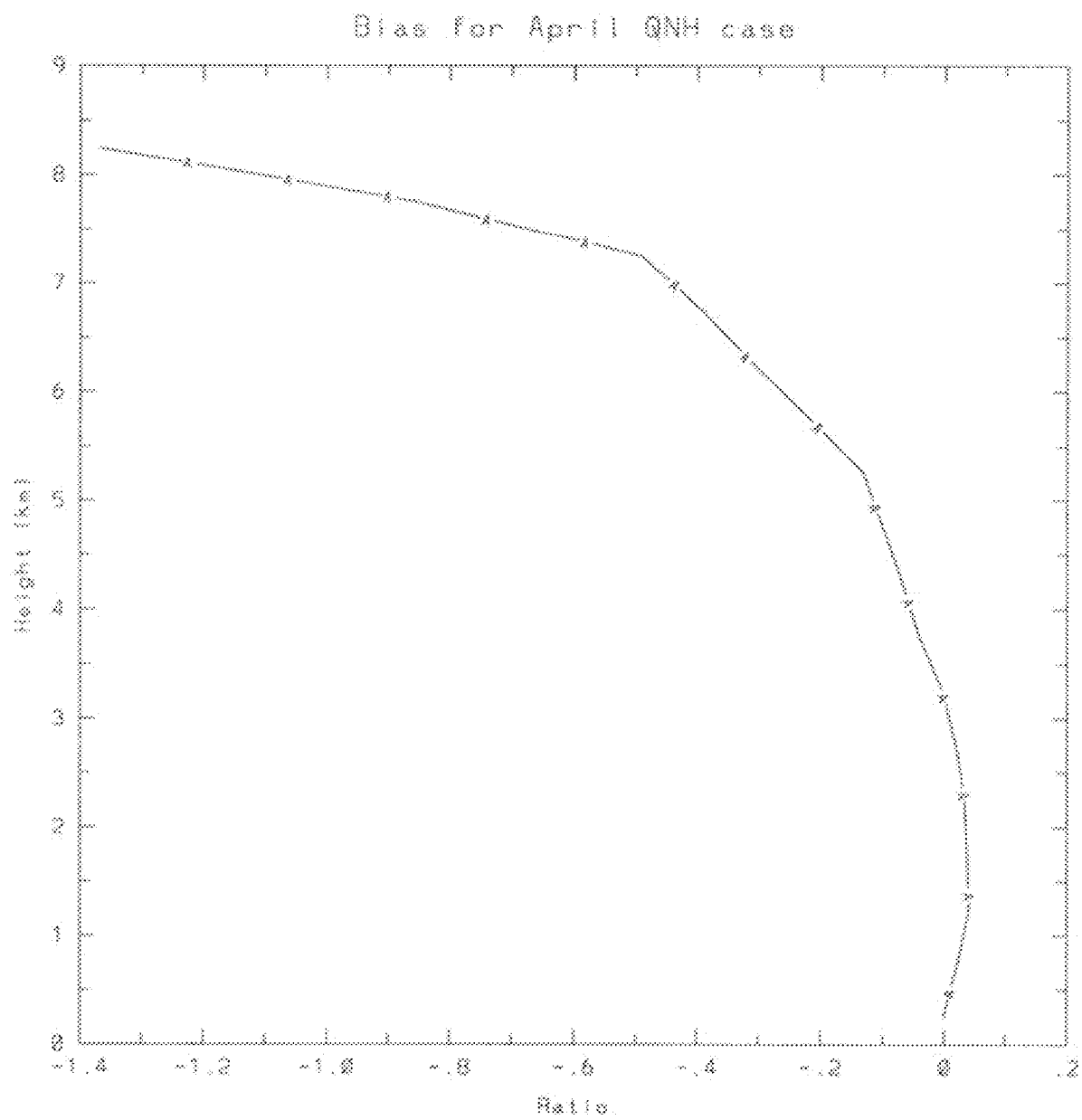
FIG. 14 shows bias for the April QNH case. Bias is defined as the departure of the 3DVAR field average from the nature run. Positive values indicate a dry bias, and negative values indicate a moist bias. Bias and accuracy are poorer above 6 km where moisture amounts approach the full-domain average 3DVAR error of 0.5 g kg$^{-1}$.

The 3DVAR slant water vapor bias for the April case is shown in FIG. 14. The bias is near zero (unbiased) up to about 6 km, and negative (a moist bias) above that level. Evidently the 3DVAR is insensitive to the actual very dry air in the upper levels as it attempts to reach a minimum difference over the entire domain.

The estimate of rms errors as a function of height in FIG. 13 allows comparison with error estimates from other sources. The National Centers for Environmental Prediction (NCEP) recently published estimated errors for radiosondes (Zapotocny et al. 2000), and Smith et al. (2001) have estimated moisture errors from the RUC model. The rms errors at two levels, 850 mb and 500 mb, were interpolated from FIG. 13 and compared with the NCEP and RUC errors. The results, shown in Table 3, indicate that the radiosonde is most accurate at both levels, with the simulated GPS network showing a significantly reduced error compared to the RUC first-guess field and the Barnes analysis. Although inferences from a single case should be limited, it is encouraging to see the GPS network-derived errors much closer to the radiosonde at 850 mb than the model guess.

An important distinction must be made between the hypothetical analysis obtained from the radiosonde network versus the GPS slant water vapor network. Now, and in the foreseeable future, the radiosondes are only released twice a day in the United States. The hypothetical slant water vapor network would deliver a three-dimensional analysis every hour. Thus, the comparisons shown in this section would be significantly stronger in favor of the slant water vapor network since a typical analysis would be "off time," that is, other than the radiosonde time. Continuous hourly moisture analysis would be helpful in severe convective weather prediction and other short-range forecast problems where rapid change is important (Emanuel et al. 1995).

6. Conclusions

A hypothetical network of ground-based GPS receivers, surface hygrometers, and lower density of moisture sounding devices has been described. An OSS used nature atmospheres from mesoscale models to assess the ability of the proposed observational network to return accurate three-dimensional moisture fields. The results of the OSS suggest that such a network would significantly increase the accuracy and specificity of moisture diagnosis.

The validity of water vapor analysis is dependent on a number of assumptions, such as the measurement of slant water vapor at angles below 6°. If measurements can be obtained with reasonable accuracy to a degree above the horizon, the network would provide moisture fields down to the surface. Correlation between small-scale mass and moisture fields could also cause difficulties. Finally, the measurement of the signal phase delay is affected by other entities, such as heavy rain (Solheim et al. 1999), which could be corrected using weather radars. A study of this type is suggestive, but not definitive concerning the role that such a network could play in operational weather prediction, particularly since history has shown that such studies err on the optimistic side. The best way to determine the value of such a system would be to field a demonstration network large enough to develop and test the concept over a period of at least a couple of years.

It is important to mention the value of accurate hourly diagnosis of the three-dimensional moisture field for areas other than meteorology. Highly accurate GPS location is partially limited by the unknown distribution of moisture and mass in the atmosphere. There are numerous potential applications of GPS that require great accuracy, such as landing an airplane. A national analysis of water vapor and a "delay function" could be made available through the Internet or some other distribution and used in GPS calculations to make them more accurate. This would be a very important additional benefit from the proposed high-resolution network of ground-based GPS sensors.

This study demonstrates that it may be feasible to determine the three-dimensional water vapor field at high temporal (every hour) and spatial (mesobeta) resolutions with much higher accuracy than currently available. We believe that such a network, used in conjunction with a high-resolution mesoscale weather prediction model, might deliver a significant improvement in prediction of precipitation and severe weather.

TABLE 1

The rms errors of the specific humidity (g kg$^{-1}$) for the 3DVAR analysis from GPS network on the top line, and for the Barnes analysis on the bottom line

| Network | QNH | MM5 |
|---|---|---|
| GPS network | 3.4 × 10$^{-3}$ | 2.4 × 10$^{-3}$ |
| Barnes raob | 7.7 × 10$^{-3}$ | 7.6 × 10$^{-3}$ |

TABLE 2

Percent errors for the 3DVAR from the GPS network on the top line and from the Barnes analysis of the radiosonde network on the bottom line

| Network | QNH | MM5 |
|---|---|---|
| GPS network | 20% | 14% |
| Barnes | 47% | 33% |

TABLE 3

Specific humidity (g kg$^{-1}$) rms errors at 850 mb and 500 mb for radiosondes, the 3DVAR from the GPS network, the RUC model first guess, and the Barnes analysis. The GPS simulation provides moisture estimates significantly better than model guess fields, but inferior to radiosondes

| Network | 850 mb | 500 mb |
|---|---|---|
| Radiosondes | 0.47 | 0.30 |
| GPS network | 0.70 | 0.53 |
| RUC guess | 1.95 | 0.74 |
| Barnes | 2.50 | 0.80 |

REFERENCE

Alber, C., R. Ware, C. Rocken, and J. Braun, 2000: Obtaining single path phase delays from GPS double differences. Geophys. Res. Lett, 27, 2661-2664. Crossref, Google Scholar Barnes, S. L., 1981: SESAME 1979 Data User's Guide. Project SESAME, U.S. Department of Commerce, NOAA/ERL, 236 pp. Google Scholar Bevis, M., S. Businger, T. A. Herring, C. Rocken, R. A. Anthes, and R. H. Ware, 1992: GPS meteorology: Remote sensing of atmospheric water vapor using the Global Positioning System. J. Geophys. Res, 97, 15787-15801. Crossref, Google Scholar Bevis, M., S. Businger, S. Chiswell, T. Herring, R. Anthes, C. Rocken, and R. Ware, 1994: GPS meteorology: Mapping zenith wet delays onto precipitable water. J. Appl. Meteor, 33, 379-386. Link, Google Scholar Braun, J., C. Rocken, and R. Ware, 2001: Validation of single slant water vapor measurements with GPS. Radio Sci, 36, 459-472. Crossref, Google Scholar Byrd, R., P. Lu, J. Nocedal, and C. Zhu, 1995: A limited memory algorithm for bound constrained optimization. SIAM J. Sci. Comput, 16, 1190-1208. Crossref, Google Scholar Chen, G., and T. Herring, 1997: Effects of atmospheric azimuthal asymmetry on the analysis of space geodetic data. J. Geophys. Res, 102, (B9), 20489-20502. Crossref, Google Scholar Davis, J., G. Elgered, A. Niell, and C. Kuehn, 1993: Ground-based measurement of gradients in the "wet" radio refractivity of air. Radio Sci, 28, 1003-1018. Crossref, Google Scholar Dudhia, J., 1993: A nonhydrostatic version of the Penn State-NCAR Mesoscale Model: Validation tests and simulation of an Atlantic cyclone and cloud front. Mon. Wea. Rev, 121, 1493-1513. Link, Google Scholar Elosegui, P., J. Davis, L. Gradinarsky, G. Elgered, J. Johansson, D. Tahmoush, and A. Rius, 1999: Sensing atmospheric structure using small-scale space geodetic networks. Geophys. Res. Lett, 26, 2445-2448. Crossref, Google Scholar Emanuel, K., and and Coauthors, 1995: Report of the First Prospectus Development Team of the U.S. Weather Research Program to NOAA and the NSF. Bull. Amer. Meteor. Soc, 76, 1194-1208. Google Scholar Fang, P., M. Bevis, Y. Bock, S. Gutman, and D. Wolfe, 1998: GPS meteorology: Reducing systematic errors in geodetic estimates for zenith delay. Geophys. Res. Lett, 25, 3583-3596. Crossref, Google Scholar Güeldner, J., and D. Spänkuch, 2001: Remote sensing of the thermodynamic state of the atmospheric boundary layer by ground-based microwave radiometry. J. Atmos. Oceanic Technol, 18, 925-933. Link, Google Scholar Guo, Y. R., Y. H. Kuo, J. Dudhia, D. B. Parsons, and C. Rocken, 2000: Four-dimensional variational data assimilation of heterogeneous mesoscale observations for a strong convective case. Mon. Wea. Rev, 128, 619-643. Link, Google Scholar Kaplan, E., 1996: Understanding GPS Principles and Applications. Artech House, 522 pp. Google Scholar Kuo, Y. H., Y. R. Guo, and E. R. Westwater, 1993: Assimilation of precipitable water measurements into a mesoscale model. Mon. Wea. Rev, 121, 1215-1238. Link, Google Scholar Kuo, Y. H., X. Zou, and Y. R. Guo, 1996: Variational assimilation of precipitable water using a nonhydrostatic mesoscale adjoint model. Part I: Moisture retrieval and sensitivity experiements. Mon. Wea. Rev, 124, 122-147. Link, Google Scholar Liu, D., and J. Nocedal, 1989: On the limited memory BFGS method for large-scale optimization. Math. Program, B-45, 503-528. Crossref, Google Scholar Lowry, A., S. Sokolovskiy, C. Rocken, and K. Anderson, 2001: Vertical profiling of atmospheric refractivity from ground-based GPS observations. Radio Sci, in press. Google Scholar MacDonald, A., and Y. Xie, 2000: On the use of slant observations from GPS to diagnose three-dimensional water vapor using 3DVAR. Preprints, Fourth Symp. on Integrated Observing Systems, Long Beach, Calif., Amer. Meteor. Soc., 62-73. Google Scholar MacDonald, A., J. Lee, and S. Sun, 2000: QNH: Design and test of a quasi-nonhydrostatic model for mesoscale weather prediction. Mon. Wea. Rev, 128, 1016-1036. Link, Google Scholar Niell, A., 1996: Global mapping functions for the atmosphere delay at radio wavelengths. J. Geophys. Res, 101, 3227-3246. Crossref, Google Scholar Palmen, E., and C. W. Newton, 1969: Atmospheric Circulation Systems. Academic Press, 603 pp. Google Scholar Rocken, C., R. Ware, T. Van Hove, F. Solheim, C. Alber, J. Johnson, M. Bevis, and S. Businger, 1993: Sensing atmospheric water vapor with the Global Positioning System. Geophys. Res. Lett, 20, 2631-2634. Crossref, Google Scholar Rocken, C., T. Van Hove, and R. Ware, 1997: Near real-time sensing of atmospheric water vapor. Geophys. Res. Lett, 24, 3221-3224. Crossref, Google Scholar Rocken, C., S. Sokolovskiy, J. Johnson, and D. Hunt, 2001: Improved mapping of tropospheric delays. J. Atmos. Oceanic Technol, 18, 1205-1213. Link, Google Scholar Segall, P., and J. Davis, 1997: GPS applications for geodynamics and earthquake studies. Annu. Rev. Earth Planet. Sci, 25, 301-336. Crossref, Google Scholar Smith, T. L., S. Benjamin, B. Schwartz, and S. Gutman, 2001: Using GPS-IPW in a 4-D data assimilation system. Earth, Planets Space, in press. Google Scholar Sokolovskiy, S., C. Rocken, and A. Lowry, 2001: The use of GPS for estimation of bending angles of radio waves at low elevations. Radio Sci, 36, 473-482. Crossref, Google Scholar Solheim, F., J. Godwin, E. Westwater, Y. Han, S. Keihm, K. Marsh, and R. Ware, 1998: Radiometric profiling of temperature, water vapor, and liquid water using various inversion methods. Radio Sci, 33, 393-404. Crossref, Google Scholar Solheim, F., J. Vivekanandan, R. Ware, and C. Rocken, 1999: Propagation delays induced in GPS signals by dry air, water vapor, hydrometeors, and other particulates. J. Geophys. Res, 104, (D8), 9663-9670. Crossref, Google Scholar Ware, R., C. Alber, C. Rocken, and F. Solheim, 1997: Sensing integrated water vapor along GPS ray paths. Geophys. Res. Lett, 24, 417-420. Crossref, Google Scholar Ware, R., D. Fulker, S. Stein, D. Anderson, S. Avery, R. Clark, K. Droegemeier, J. Kuettner, J. Minster, and S. Sorooshian, 2000: SuomiNet: A real-time national GPS network for atmospheric research and education. Bull. Amer. Meteor. Soc, 81, 677-691. Link, Google Scholar Wolfe, D. E., and S. I. Gutman, 2000: Developing an operational, surface-based, GPS, water vapor observing system for NOAA: Network design and results. J. Atmos. Oceanic Technol, 17, 426-440. Link, Google Scholar Zapotocny, T. H., and and Coauthors, 2000: A case study of the sensitivity of the Eta data assimilation system. Wea. Forecasting, 15, 603-621. Link, Google Scholar

What is claimed is:

1. A method comprising:
    receiving, at a processing system, and from a plurality of Global Navigation Satellite Systems (GNSS) stations, navigation data corresponding to computed positions of the plurality of GNSS stations;
    receiving, at the processing system, GNSS transmitter information comprising one or more of:
        GNSS satellite positional information;
        GNSS clock information; and
        GNSS transmission frequency information;
    determining, based at least in part on the received navigation data and the received GNSS transmitter information, ionosphere and atmosphere refractivity associated with navigation data, wherein the ionosphere and atmosphere refractivity N comprises density delay components for dry air, wet air, liquid, and ions respectively is represented by:

$$N = \text{dry} + \text{wet} + \text{liquid} + \text{ion};$$

where:

$$N = 222.76\, \rho_a + 1.72 \times 10^6 \left(\frac{\rho_v}{T}\right) + 1.4 \times 10^{-3} W_L + 4.03 \times 10^7 \frac{d_e}{f^2};$$

$\rho_a$=atmospheric density in kg/m$^3$,
$\rho_v$=water vapor density in kg/m$^3$;
T=atmospheric temperature in degrees Kelvin,
$d_e$=electron density (ions per m$^3$),
f=transmitter frequency in Hz, and
$W_L$=liquid water droplet density in kg/m$^3$;

determining, based at least in part on the refractivity, three-dimensional (3D) density states of the atmosphere and ionosphere corresponding to intersections of two or more GNSS signals;

calculating, by the processing system, and based on the determined 3D density states, a 3D representation of the 3D density states; and transmitting position adjustment data to calibrate a navigation position of at least one of the plurality of the GNSS stations based at least in part on the 3D representation.

2. The method of claim 1, wherein the plurality of GNSS stations include one or more of: a CubeSat, a mobile GPS receiver, a mobile computing device, a cell phone, a receiver of an airplane, and a smartphone.

3. The method of claim 1, wherein at least a portion of the plurality of GNSS stations comprise one or more local processors, and wherein the computed positions are determined by the corresponding local processors.

4. The method of claim 1, wherein the GNSS transmitter information is further received from one or more of:
    one or more GNSS stations; and
    a precise positioning service.

5. The method of claim 1, wherein the navigation data and the GNSS transmitter information corresponds to four or more GNSS satellites, and wherein determining the 3D density states comprises determining intersection angles of the two or more GNSS signals.

6. The method of claim 1, wherein determining the 3D density states comprises determining dynamic changes associated with the atmosphere and ionosphere.

7. The method of claim 1, wherein determining the 3D density states comprises predicting future density states associated with the atmosphere and ionosphere.

8. The method of claim 1, wherein the 3D representation of the three-3D density states is refined by feedback between one or more of the plurality of the GNSS stations and the processing system.

9. The method of claim 1, wherein determining the ionosphere and atmosphere refractivity comprises determining the 3D density states by minimizing a difference in least-squares between integrated refraction of density over one-dimensional rays to determine an optimal three-dimensional structure.

* * * * *